(12) United States Patent
Matsumoto et al.

(10) Patent No.: US 8,356,208 B2
(45) Date of Patent: *Jan. 15, 2013

(54) METHOD OF COLLECTING INFORMATION IN SYSTEM NETWORK

(75) Inventors: Masayoshi Matsumoto, Yokohama (JP); Yuji Mizote, Kamakura (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,418

(22) Filed: Nov. 29, 2011

(65) Prior Publication Data

US 2012/0072775 A1 Mar. 22, 2012

Related U.S. Application Data

(63) Continuation of application No. 12/175,561, filed on Jul. 18, 2008, now Pat. No. 8,086,905.

(30) Foreign Application Priority Data

May 27, 2008 (JP) ................................. 2008-138459

(51) Int. Cl.
G06F 11/10 (2006.01)

(52) U.S. Cl. ........................................................ 714/37

(58) Field of Classification Search ................... 714/26, 714/37, 47.1

See application file for complete search history.

(56) References Cited

U.S. PATENT DOCUMENTS

| | | | |
|---|---|---|---|
| 5,740,438 A | 4/1998 | Ratcliff et al. | |
| 6,330,615 B1 | 12/2001 | Gioquindo et al. | |
| 6,457,142 B1 | 9/2002 | Klemm et al. | |
| 7,069,480 B1 | 6/2006 | Lovy et al. | |
| 7,206,833 B1 | 4/2007 | Sarangam et al. | |
| 2004/0107278 A1 | 6/2004 | Emaru et al. | |
| 2004/0153692 A1 | 8/2004 | O'Brien et al. | |
| 2004/0205681 A1 | 10/2004 | Nozuyama | |
| 2005/0086502 A1 | 4/2005 | Rayes et al. | |

(Continued)

FOREIGN PATENT DOCUMENTS

JP 01-152838 A 6/1989

(Continued)

OTHER PUBLICATIONS

Frederick Hayes-Roth, "Rule-Based Systems," Communications of ACM, vol. 28, Issue 9, Sep. 1985, pp. 921 to 932.

*Primary Examiner* — Scott Baderman
*Assistant Examiner* — Yair Leibovich
(74) *Attorney, Agent, or Firm* — Foley & Lardner LLP

(57) ABSTRACT

To quickly establish an inferring result when a problem is detected in an operation management system equipped with a rule-based inference processing function, there is provided a method of collecting information for managing a computer system equipped with a plurality of devices. The computer system holds rule for associating a plurality of events with a conclusion output when all of the plurality of events have been detected. The method includes: executing, at a first interval, polling to obtain information indicating whether each of the plurality of events has been detected; judging whether the plurality of events have been detected; and executing, upon judgment that at least one of the plurality of events has been detected and none of the remaining events have been detected, before execution of next polling at the first interval, polling to obtain information indicating whether at least one of the undetected remaining events has been detected.

12 Claims, 27 Drawing Sheets

U.S. PATENT DOCUMENTS

| | | |
|---|---|---|
| 2005/0144505 A1 | 6/2005 | Takeuchi et al. |
| 2005/0267967 A1 | 12/2005 | Markos et al. |
| 2006/0120292 A1 | 6/2006 | Yardeni et al. |
| 2007/0074076 A1 | 3/2007 | Imai et al. |
| 2007/0088974 A1* | 4/2007 | Chandwani et al. ............ 714/6 |
| 2008/0114806 A1 | 5/2008 | Kosche |
| 2008/0183339 A1 | 7/2008 | Vaswani et al. |
| 2011/0055620 A1 | 3/2011 | Sengupta |
| 2011/0167433 A1 | 7/2011 | Appelbaum et al. |
| 2011/0173496 A1 | 7/2011 | Hosek et al. |

FOREIGN PATENT DOCUMENTS

| | | |
|---|---|---|
| JP | 09-258983 | 10/1997 |
| JP | 2004-178336 | 6/2004 |
| JP | 2007-334716 A | 12/2007 |

* cited by examiner

WORKING MEMORY 310

| EVENT | T/F |
|---|---|
| E1 | T |
| E2 | F |
| E2 | F |
| E4 | F |

311 → EVENT column; 312 → T/F column; 313 → E1 row; 314 → E2 row; 315 → E2 row; 316 → E4 row

FIG. 2

CONCLUSION DEFINITION TABLE 260

| CONCLUSION ID | CONCLUSION MESSAGE |
|---|---|
| X | ROOT CAUSE IS DISK FAILURE OF STORAGE DEVICE A |
| Y | ROOT CAUSE IS DISK FAILURE OF STORAGE DEVICE B |

261 = CONCLUSION ID column
262 = CONCLUSION MESSAGE column
263 = row X
264 = row Y

FIG. 4

EVENT COUNT TABLE 540

| | EVENT ID (541) | COUNT (542) |
|---|---|---|
| 543 | E2 | 1 |
| 544 | E3 | 1 |
| 545 | E4 | 1 |
| 546 | E5 | 2 |

FIG. 15

POLLING TASK QUEUE 850

| ORDER | EVENT ID |
|---|---|
| 1 | E1 |
| 2 | E2 |
| 3 | E3 |
| 4 | E4 |

851 (ORDER column), 852 (EVENT ID column)
853 (row 1), 854 (row 2), 855 (row 3), 856 (row 4)

FIG. 18

POLLING TASK QUEUE 850

POLLING TASK EXECUTION PROGRAM 820

POLLING TASK QUEUE 850

| ORDER | EVENT ID |
|---|---|
| 1 | E3 |
| 2 | E1 |
| 3 | E2 |
| 4 | E4 |

851 ORDER
852 EVENT ID
862 — row 1
863 — row 2
864 — row 3
865 — row 4

FIG. 24

RE-EVALUATION EXECUTION CONDITION TABLE 900

| CONDITION | T/F |
|---|---|
| PASSAGE OF PREDETERMINED TIME | T |
| EXECUTION INSTRUCTION BY USER | F |
| EVENT DETECTION | F |

FIG. 26

METHOD OF COLLECTING INFORMATION IN SYSTEM NETWORK

CROSS-REFERENCE TO RELATED PATENT APPLICATIONS

Japan Priority Application JP2008-138459 filed May 27, 2008 including the specification, drawings, claims and abstract, is incorporated herein by reference in its entirety. This application is a Continuation of U.S. application Ser. No. 12/175,561, filed Jul. 18, 2008, incorporated herein by reference in its entirety.

BACKGROUND

This invention relates to a method of collecting information for quickly determining a failure cause inferring result in an operation management system which manages an operation of a computer system.

In a computer system which includes a plurality of devices, a failure occurring in one of the devices may cause failures in the other devices. For example, when a disk failure occurs in an external storage device, a logical disk error also occurs in a device of an application server which uses the storage device. When a plurality of such device failures are detected, there is available an operation management system which has a root cause analysis (RCA) function of inferring the failure root cause device.

Generally, a rule-based system (production system) is used as means for realizing inference processing. Exemplary rule-based systems are described in JP 09-258983 A and "Rule-based systems" by Frederick Hayes-Roth, Communications of ACM, Vol. 28, Issue 9 (September 1985), pages 921 to 932.

In the operation management system for managing the operation of the computer system, an RCA function can be realized by executing rule-based inference processing of a root cause based on detected failure information.

US 2006/120292 describes a method of collecting only basic information at normal time and detailed information when a problem occurs during inference processing. Specifically, a pair of normal observation information and additional observation information is defined beforehand. When a failure is detected during normal observation, additional observation information corresponding to the failure is collected. Thus, an inferring result higher in accuracy than that obtained only from a result of normal observation can be obtained.

JP 2004-178336 A describes a method of specifying operation data necessary for failure analysis based on operation data collected from a monitoring target device and event information of a failure occurrence to carry out failure analysis.

U.S. Pat. No. 7,069,480 describes a method of giving a warning to each device when a problem is detected or confirmed by using RCA. U.S. Pat. No. 7,069,480 further describes a method of collecting information for confirmation from a failure-detected device when a problem is detected.

SUMMARY

Use of the exemplary rule-based systems described in JP 09-258983 A and "Rule-based systems" by Frederick Hayes-Roth, Communications of ACM, Vol. 28, Issue 9 (September 1985), pages 921 to 932 can realize inference processing by RCA in the operation management system. In the case of inference processing using the rule-based system, however, an inferring result cannot be established unless all conditions defined in an if-conditional sentence are satisfied.

For example, it is presumed that the following rule is defined:
if E1 & E2 then X
In this rule, for example, E1, E2, and X are the following events and conclusion:
E1: logical disk failure occurs in computer A
E2: disk failure occurs in storage device A
X: root cause is disk failure of storage device A
In this case, only after both of E1 (logical disk failure of the computer A) and E2 (disk failure of the storage device A) can be detected, an inferring result of X (root cause is the disk failure of the storage device A) is established. In other words, when only either one of the failure events of E1 and E2 is detected, no inferring result is established.

In other words, to establish an inferring result using the rule-based system, all conditions defined in an if-conditional sentence have to be satisfied.

In the operation management system, to collect status or performance information of the target management device, an agent method that distributes an information collection program to each management target device and an agentless method that does not distribute any information collection program are available. In the case of the agentless method, the operation management system side carries out polling for information collection via a network for each management target device at regular intervals. The regular intervals are generally several to several tens of minutes. As polling is carried out in order for the devices, time of actually executing polling varies from one device to another.

Thus, the exemplary rule has a problem in that no inferring result is established until polling is executed for the storage device A and a failure event occurs in the storage device A after a logical disk failure of the computer A is detected. Especially, when a disk failure occurs in the storage device A immediately after the end of polling for the storage device A, no inferring result is established until a failure event is detected by next regular polling (in other words, regular polling for collecting information). In other words, no inferring result may be established for several to several tens of minutes.

Even in the case of the agent method, a similar problem may occur because of a difference in timing of executing a regular monitoring process of the information collection program distributed to each device.

The use of the method described in "Rule-based systems" by Frederick Hayes-Roth, Communications of ACM, Vol. 28, Issue 9 (September 1985), pages 921 to 932 enables RCA inference processing using the rule-based system. However, there is no mention on an information acquisition method for currently undetected failures. In other words, because the currently undetected failures cannot be detected until timing of next regular polling, establishment of an inferring result may be delayed.

Use of US 2006/120292 enables inference processing for obtaining a highly accurate inferring result when a failure occurs while reducing a network load at normal time. However, because currently undetected failures cannot be detected until timing of next regular polling, establishment of an inferring result may be delayed.

Likewise, use of JP 2004-178336 A enables specifying of operation data necessary for failure analysis among operation data of the management target device. However, currently undetected failures cannot be detected until timing of next regular polling.

Use of U.S. Pat. No. 7,069,480 enables, when a failure is detected, execution of information collection for confirmation for the failure-detected device. However, for the concerned devices, currently undetected failures cannot be detected until timing of next regular polling.

This invention has an object to provide a method of quickly establishing an inferring result or a method of quickly improving accuracy of an inferring result before timing of next regular polling when a problem such as a failure is detected in an operation management system equipped with a rule-based inference processing function such as RCA.

According to a representative invention disclosed in this application, there is provided a method of collecting information for managing a computer system equipped with a plurality of devices, a management computer being coupled to the plurality of devices, the plurality of devices including at least one computer, the management computer including a first communication device coupled to the at least one computer, a first processor coupled to the first communication device, and a first memory coupled to the first processor, the at least one computer including a second communication device coupled to the management computer, a second processor coupled to the second communication device, and a second memory coupled to the second processor, the management computer holding rule information for associating at least one event set including a plurality of events detected by the plurality of devices with a conclusion output when all of the plurality of events included in the at least one event set have been detected, the at least one event set including a first event set containing a first plurality of events, the rule information containing a first rule for associating the first event set with a first conclusion output when all of the first plurality of events included in the first event set have been detected, the method comprising: a first step of executing, by the management computer, at a first interval, polling to obtain information indicating whether each of the first plurality of events has been detected; a second step of judging, by the management computer, based on a response to the polling, whether the first plurality of events have been detected; and a third step of executing, by the management computer, upon judgment that at least one of the first plurality of events has been detected and none of the remaining events have been detected, before execution of next polling at the first interval, polling to obtain information indicating whether at least one of the undetected remaining event has been detected.

The computer includes a processor, a memory, and a communication device, and may be one of a server, a personal computer, an external storage device, and a network switch.

In the operation management system equipped with the rule-based inference processing function such as RCA, when a problem such as a failure is detected, an inferring result can be quickly established before timing of next regular polling.

BRIEF DESCRIPTION OF THE DRAWINGS

FIG. 2 illustrates an event situation table which is a part of data stored in a working memory according to the first embodiment of this invention.

FIG. 4 illustrates a format of a conclusion definition table according to the first embodiment of this invention.

FIG. 15 illustrates a format of an event count table according to the third embodiment of this invention.

FIG. 18 illustrates a format of a polling task queue according to the fourth embodiment of this invention.

FIG. 24 illustrates an example of the polling task queue at a certain time point in the middle of execution of a re-evaluation program according to the fifth embodiment of this invention.

FIG. 26 illustrates a format of a re-evaluation execution condition table according to the first embodiment of this invention.

DETAILED DESCRIPTION OF THE PREFERRED EMBODIMENTS

Figure 1:
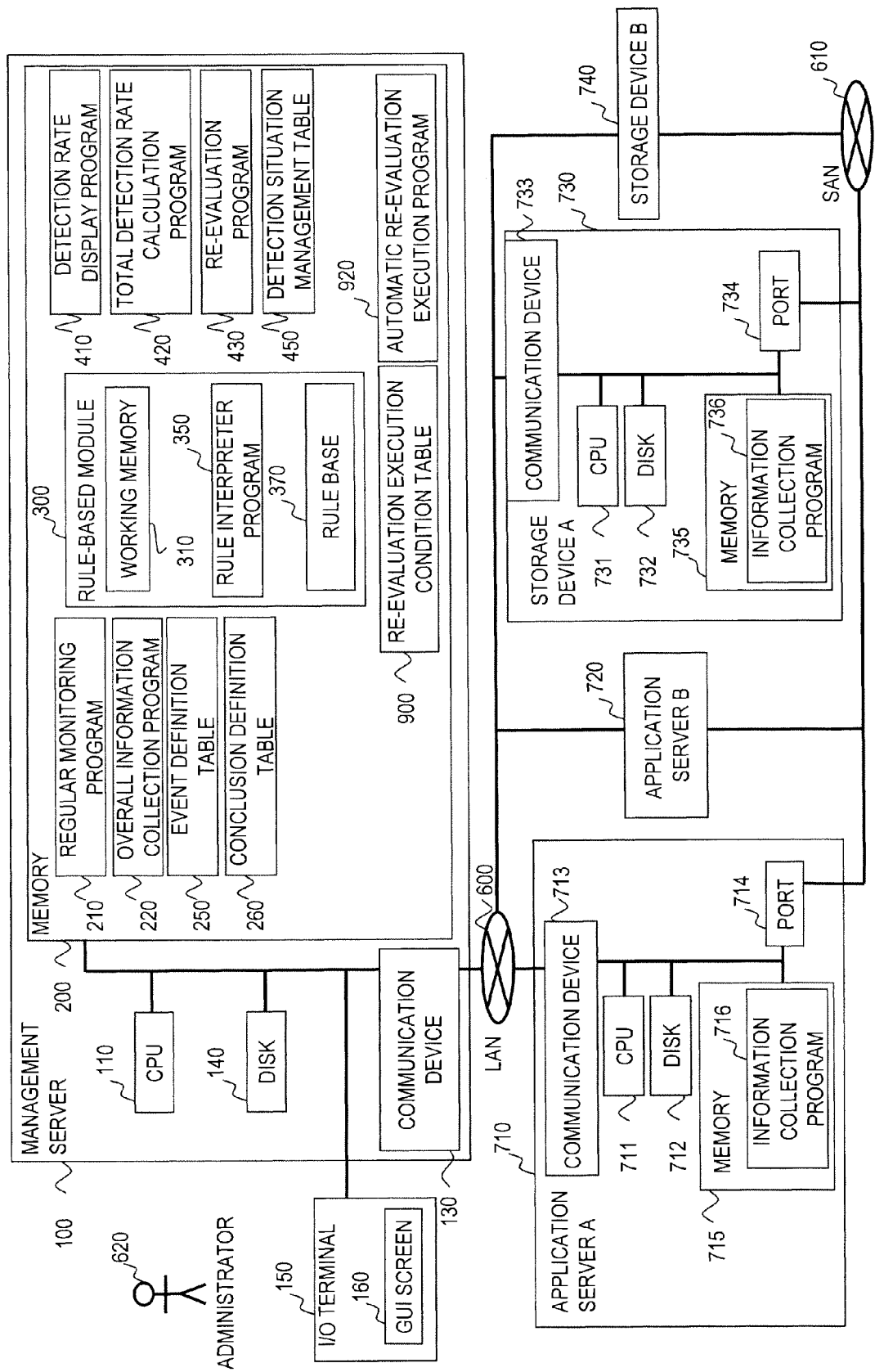
FIG. 1 is a block diagram illustrating a configuration of an operation management system according to a first embodiment of this invention.

Embodiments of this invention will be described below referring to the drawings.

First, a first embodiment of this invention will be described.

FIG. 1 is a block diagram illustrating a configuration of an operation management system according to the first embodiment of this invention.

The operation management system of the first embodiment is realized on a computer system which includes a management server 100, application servers A 710 and B 720, and storage devices A 730 and B 740.

These components are coupled to a local area network (LAN) 600 via communication devices 130, 713, and 733, respectively. Among the devices through the LAN 600, information is referenced to or set, and an information collection command or collected data is transferred. The application servers A 710 and B 720 and the storage devices A 730 and B 740 are coupled to a storage area network (SAN) 610 via ports 714 and 734, respectively. Through the SAN 610, data used for an application is transmitted and received.

The application server A 710 is, for example, a personal computer, and includes a CPU 711, a disk 712, a communication device 713, a port 714, and a memory 715. In the disk 712 which is a storage device such as a hard disk drive (HDD), an information collection program 716 is stored and prepared. The information collection program 716 is loaded on the memory 715 to be executed by the CPU 711. The information collection program 716 collects status or performance information of the CPU 711, the disk 712, the communication device 713, the port 714, and the memory 715. The information collection program 716 may collect status information from devices other than the above devices. The information collection program 716 may be mounted as standard equipment on an operating system (OS, not shown) of the application server A 710.

The application server B 720 includes a device which has a function similar to that of the application server A 710, and thus detailed illustration thereof is not shown. However, the application server B 720 may be different in configuration from the application server A 710.

The storage device A 730 includes a CPU 731, a disk 732, a communication device 733, a port 734, and a memory 735. In the disk 732 which is a storage device such as an HDD, an information collection program 736 is stored and prepared. The information collection program 736 is loaded on the memory 735 to be executed by the CPU 731. The information collection program 736 collects status or performance information of the CPU 731, the disk 732, the communication device 733, the port 734, and the memory 735. The information collection program 736 may collect status information from devices other than the above devices.

The storage device B 740 includes a device having a function similar to that of the storage device A 730, and thus detailed illustration thereof is not shown. However, the storage device B 740 may be different in configuration from the storage device A 730.

The management server 100 is, for example, a personal computer, and includes a CPU 110, a communication device 130, a disk 140 such as an HDD, and a memory 200.

A regular monitoring program 210, an overall information collection program 220, an event definition table 250, a conclusion definition table 260, a rule-based module 300, a detection rate display program 410, a total detection rate calculation program 420, a re-evaluation program 430, a detection situation management table 450, a re-evaluation execution condition table 900, and an automatic re-evaluation execution program 920 are stored and prepared in the disk 140, and loaded to the memory 200 when executed. Each program loaded on the memory 200 is executed by the CPU 110.

The rule-based module 300 includes a rule base 370 containing information for defining a rule, a working memory 310 which is a storing destination of data, and a rule interpreter program 350. The rule interpreter program 350 reads information from the rule base 370, and uses the working memory 310 as a data storing destination and a data reading source to realize inference processing.

Storage formats of the event definition table 250, the conclusion definition table 260, the working memory 310, the rule base 370, the detection situation management table 450, and the re-evaluation execution condition table 900 will be described below in detail.

Characteristic functions and operations of the regular monitoring program 210, the overall information collection program 220, the detection rate display program 410, the total detection rate calculation program 420, the re-evaluation program 430, and the automatic re-evaluation execution program 920 will also be described below in detail.

An I/O terminal 150 equipped with an input device such as a keyboard or a mouse and a display device for displaying information are coupled to the management server 100. The input device is used for input regarding an execution instruction of each program from an administrator 620. The display device is used for displaying each processing result. The display device includes a graphical user interface (GUI) screen 160.

According to the embodiment, the application server A 710 uses disk volumes of the storage devices A 730 and B 740, while the application server B 720 uses a disk volume of the storage device B 740. In other words, it is only the application server A 710 that uses the disk volume of the storage device A 730. It is two servers, i.e., the application servers A 710 and B 720 that use the disk volume of the storage device B 740.

Examples of if-then rules created by the administrator 620 based on a connection relation between the application servers and the storage devices are as follows:

Rule 1: if E1 & E3 then X
Rule 2: if E1 & E2 & E4 then Y

Each rule associates a conditional sentence subsequent to if with a conclusion subsequent to then. The if-conditional sentence defines an event set including at least one event. When all the events included in the set are detected, a conclusion corresponding to the if-conditional sentence is established. The event means a certain phenomenon observed in the device, typically a failure observed in the device. The failure may include deterioration of execution performance.

Specifically, the rule 1 of the above rules indicates drawing of a conclusion X when the events E1 and E3 are both detected. The rule 2 indicates drawing of a conclusion Y when the events E1, E2, and E4 are all detected. These rules are defined in the rule base 370.

Examples of actual events and conclusions corresponding to events and conclusions included in the definition are as follows:

E1: logical disk error in application server A
E2: logical disk error in application server B
E3: disk failure in storage device A
E4: disk failure in storage device B
X: root cause is disk failure in storage device A
Y: root cause is disk failure in storage device B FIG. 2 illustrates an event situation table which is a part of data stored in the working memory 310 according to the first embodiment of this invention.

The event situation table shows each event and its detection situation in an event column 311 and a T/F column 312. In this table, an event where a value of the T/F column 312 is "T" (True) has been detected, while an event of "F" (False) is still undetected. In the example of FIG. 2, only an event E1 of a line 313 has been detected. Events E2 to E4 of lines 314 to 316 are still undetected.

Figure 3:
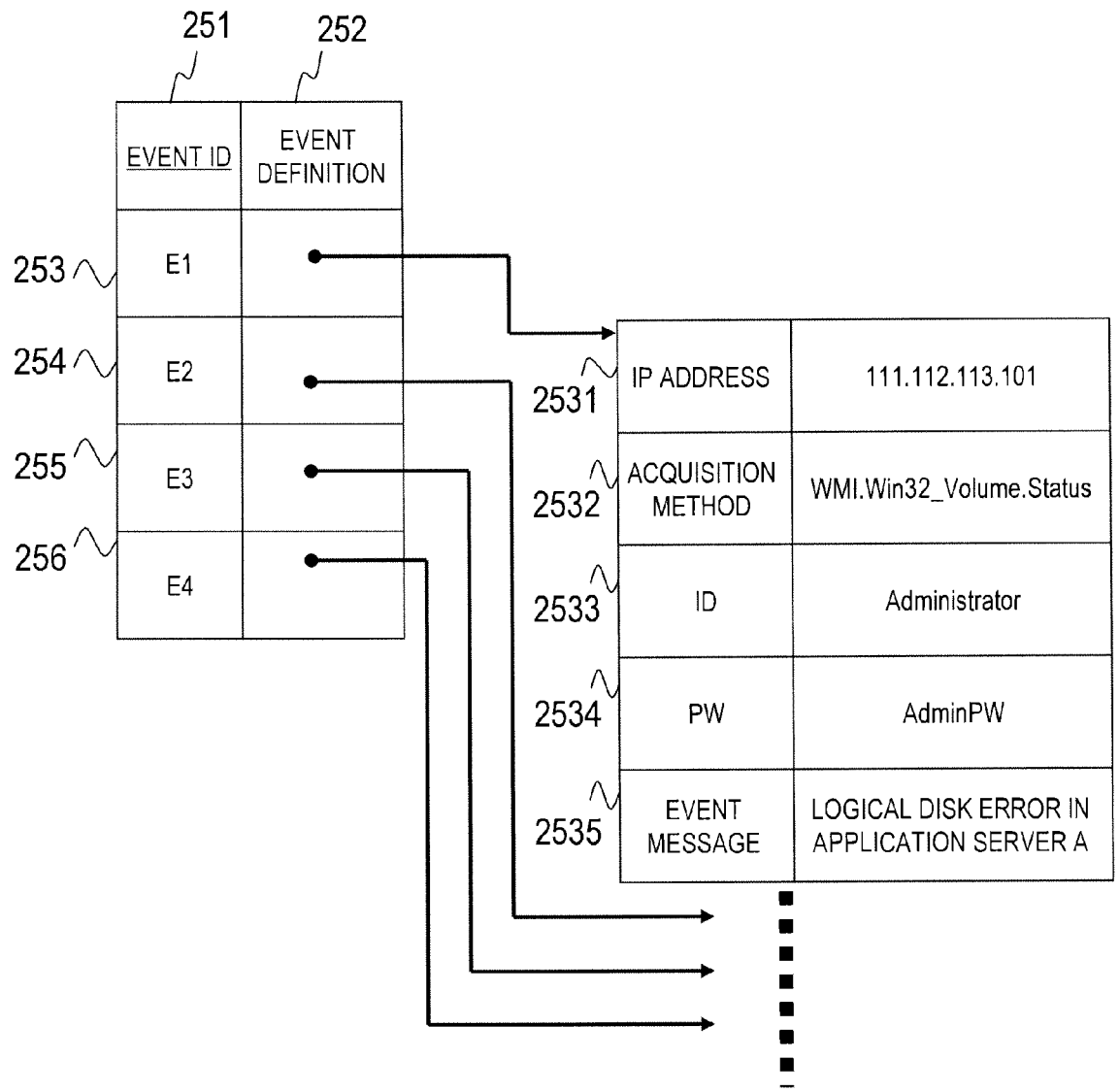
FIG. 3 illustrates a format of an event definition table according to the first embodiment of this invention.

FIG. 3 illustrates a format of the event definition table 250 according to the first embodiment of this invention.

The event definition table 250 includes an event ID column 251, and an event definition column 252 corresponding to an event identified by the event ID. The event ID's of the events E1 to E4 are "E 1" to "E4", respectively.

The event definition column 252 has a reference to each event definition. Each reference destination data includes, for example, an IP address 2531, an acquisition method 2532, an ID 2533, a PW 2534, and an event message 2535. FIG. 3 shows an example of only reference destination data corresponding to the event ID "E1", while reference destination data corresponding to other event ID's are omitted.

The IP address 2531 defines an IP address of a corresponding device where an event occurs.

The acquisition method 2532 defines an acquisition method of failure or performance information for detecting a corresponding event. This acquisition method may be an OS standard API such as windows management instrumentation (WMI) for obtaining failure or performance information.

The ID 2533 and the PW 2534 are an ID and a password used for authentication when administrator authority has to be authenticated to execute acquisition by the acquisition method 2532.

The event message 2535 is a message corresponding to an event. This message may be displayed in the display device of the I/O terminal 150 upon detection of a corresponding event.

The event definition table 250 is defined beforehand by the administrator 620.

As described above, according to the embodiment, the logical disk error of the application server A is defined as the event E1. Accordingly, in the IP address 2531 to the event message 2535 corresponding to the value "E1" of the event ID column 251, information used for detecting the logical disk error of the application server A and a message displayed when the logical disk error is detected are set.

In the example of FIG. 3, as the IP address 2531, the acquisition method 2532, the ID 2533, the PW 2534, and the event message 2535, "111.112.113.101", "WMI.Win32_Volume.Status", "Administrator", "AdminPW", and "logical disk error in application server A" are respectively set.

The setting indicates that an IP address of the application server A is "111.112.113.101", a logical disk error of the application server A is obtained by API "WMI.Win32_Volume.Status", administrator authority has to be authenticated for acquisition of the a logical disk error, an ID "Administrator" and a password "AdminPW" are used for authentication of the administrator authority, and "logical disk error in application server A" is displayed when the event E1 is detected.

FIG. 4 illustrates a format of the conclusion definition table 260 according to the first embodiment of this invention.

This table shows correspondence between a conclusion ID and a conclusion message in a conclusion ID column 261 and a conclusion message column 262. Conclusion ID's of the conclusions X and Y are respectively "X" and Y.

This conclusion definition table 260 is defined beforehand by the administrator 620.

Figure 6:
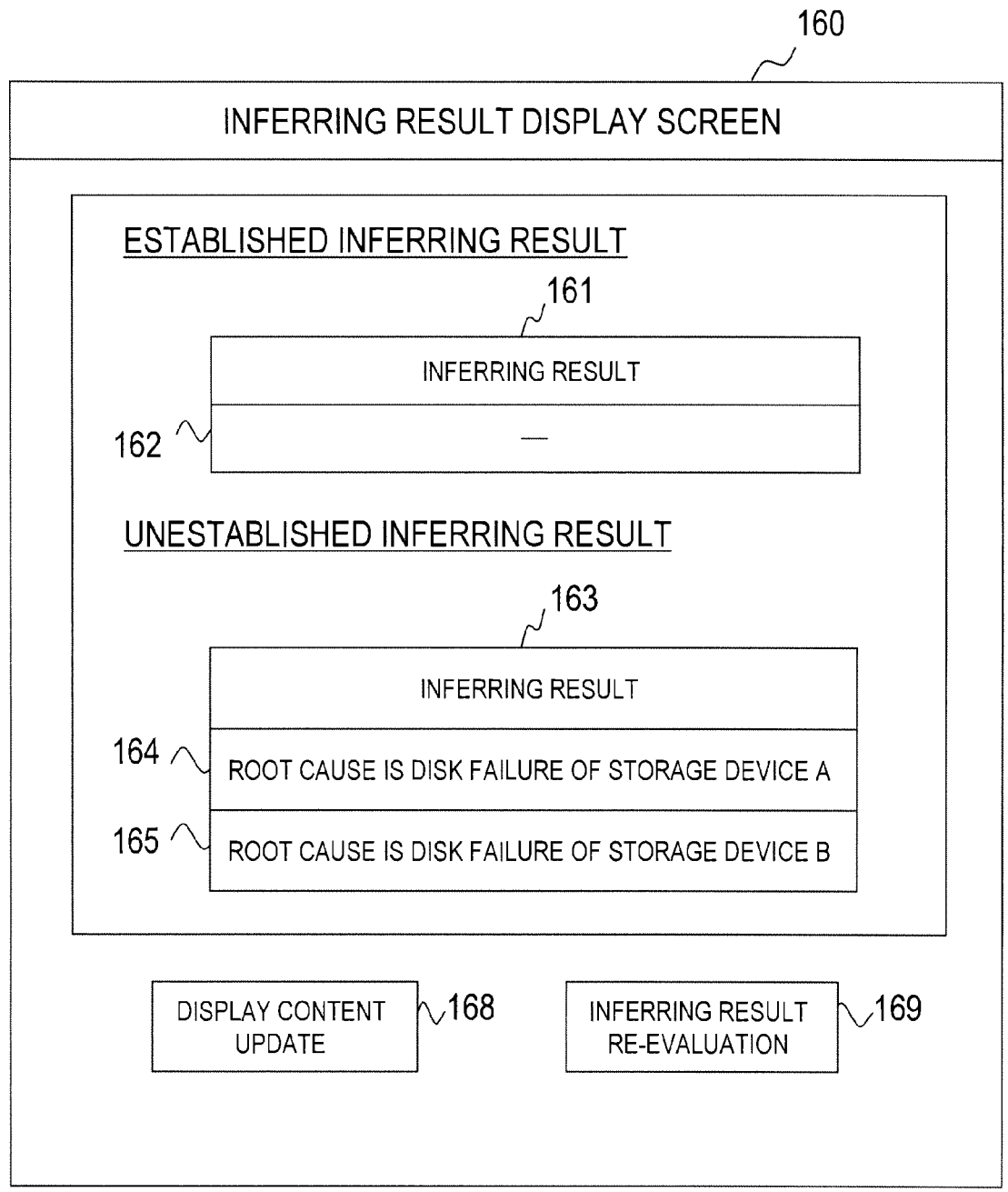
FIG. 6 illustrates contents displayed in a GUI screen according to the first embodiment of this invention.

As described above, according to the embodiment, "root cause is disk failure of storage device A" is defined as a conclusion X, and "root cause is disk failure of storage device B" is defined as a conclusion Y. Thus, in an example of FIG. 4, in the conclusion message column 262 corresponding to values "X" and "Y" of the conclusion ID column 261, conclusion messages "root cause is disk failure of storage device A" and "root cause is disk failure of storage device B" are set (lines 263 and 264, respectively). Referring to FIG. 6, these conclusion messages are displayed on the GUI screen 160 as described below.

Figure 5:
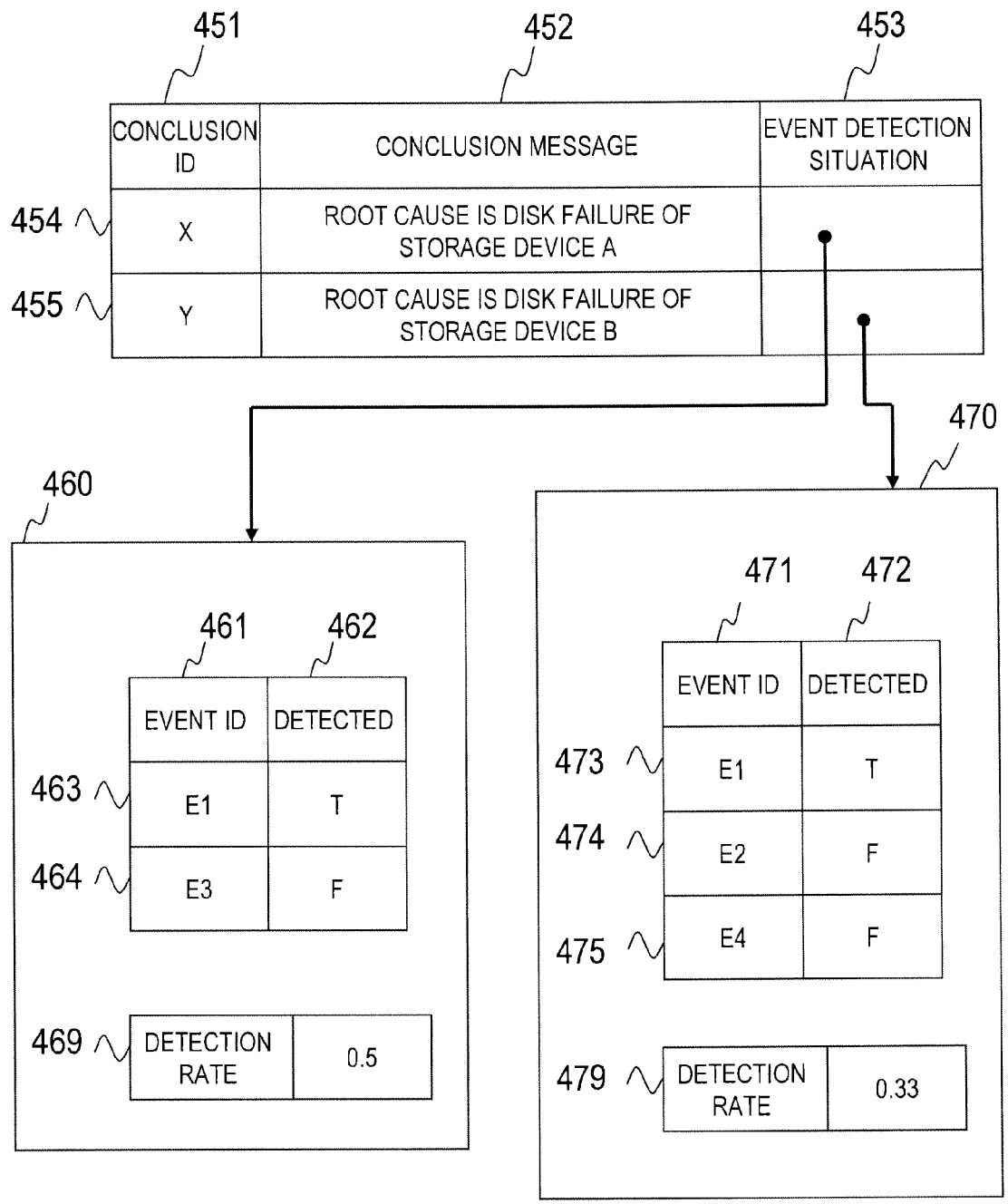
FIG. 5 illustrates a format of a detection situation management table according to the first embodiment of this invention.

FIG. 5 illustrates a format of the detection situation management table 450 according to the first embodiment of this invention.

The detection situation management table 450 includes a conclusion ID column 451, a conclusion message column 452, and an event detection situation column 453, and manages a detection situation (whether an event has actually been detected) of the event corresponding to each conclusion.

In the columns 451 and 452, a conclusion ID and a conclusion message corresponding to the conclusion ID are respectively set (lines 454 and 455).

The column 453 refers to subdata corresponding to each conclusion ID, for example, subdata 460 corresponding to the conclusion ID X and subdata 470 corresponding to the conclusion ID Y.

The subdata 460 contains a table including an event ID column 461 and a detected column 462, and data of a detection rate 469.

In the columns 461 and 462, an event ID corresponding to a conclusion ID and a value indicating whether an event identified by the event ID has been detected are respectively set. Values "T" and "F" of the column 462 respectively indicate that an event has been detected, and an event is still undetected.

In the detection rate 469, a value indicating a ratio of detected events among all events corresponding to a conclusion is set.

In an example of FIG. 5, the subdata 460 corresponds to the conclusion X. Accordingly, in the column 461, events ID's "E1" and "E3" of the events E1 and E3 corresponding to the conclusion X are set (rule 1). In the example of FIG. 5, the event E1 has been detected while the event E3 is still undetected (lines 463 and 464). Thus, ½, i.e., "0.5" is set in the detection rate 469. In this case, because not all of the events corresponding to the conclusion X have been detected (at least one is still undetected), the conclusion X has not been established yet.

The subdata 470 contains a table including an event ID column 471 and a detected column 472, and data of a detection rate 479. These are similar to the columns 461 and 462, and the detection rate 469 of the subdata 460, and thus detailed description thereof will be omitted. In the example of FIG. 5, only the event E1 among the events E1, E2, and E4 corresponding to the conclusion Y has been detected (lines 473 to 475). Thus, ⅓, i.e., "0.33", is set in the detection rate 479. In this case, because not all of the events corresponding to the conclusion Y have been detected (at least one is still undetected), the conclusion Y has not been established yet.

FIG. 6 illustrates contents displayed in the GUI screen 160 according to the first embodiment of this invention.

The GUI screen 160 is for displaying lists of established inferring results and unestablished inferring results. Specifically, the GUI screen 160 includes an established inferring result display section 161 and an unestablished inferring result display section 163. The GUI screen 160 includes a display content update button 168 and an inferring result re-evaluation button 169. These buttons are used for instructing execution of corresponding processing.

An example of FIG. 6 corresponds to that of FIG. 5. In the example of FIG. 5, none of the conclusions X and Y are established. Thus, in the example of FIG. 6, the established inferring result display section 161 is empty (line 162), and values of conclusion messages 262 (lines 164 and 165) corresponding to the conclusions X and Y are displayed in the unestablished inferring result display section 163.

The administrator 620 operates the application servers A 710 and B 720 and the storage devices A 730 and B 740 by using the management server 100. The administrator 620 instructs the management server 100 to start regular monitoring processing. The administrator 620 checks an inferring result of rule-based analysis through the GUI screen 160 of the management server 100, and instructs display content updating or inferring result re-evaluation if necessary.

A procedure of the regular monitoring processing executed by the management server 100 will be described below.

A flow of regular monitoring processing of the embodiment executed by the operation management system shown in FIG. 1 will be described.

First, the regular monitoring program 210 is executed in accordance with an instruction from the administrator 620.

Figure 7:
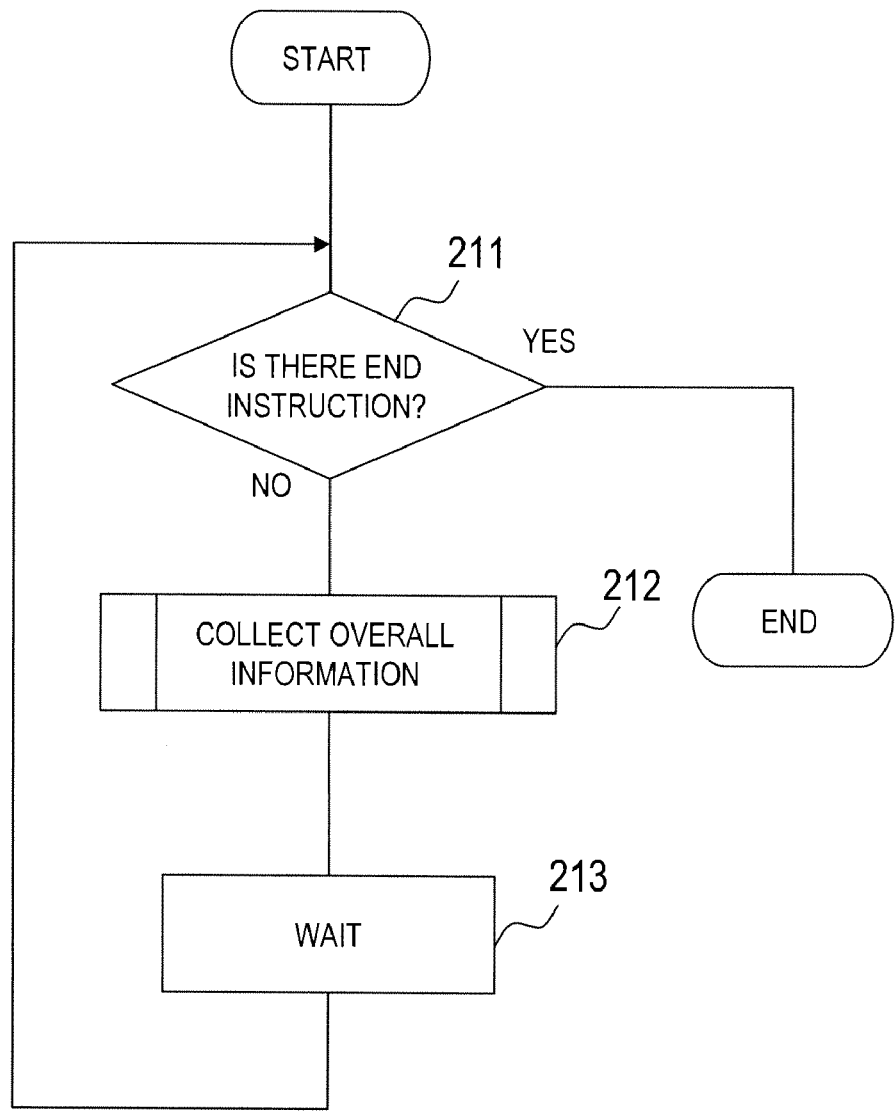
FIG. 7 is a flowchart illustrating processing of a regular monitoring program according to the first embodiment of this invention.

FIG. 7 is a flowchart illustrating processing of the regular monitoring program 210 according to the first embodiment of this invention.

The regular monitoring program 210 judges whether an end instruction has been received from the administrator 620 (Step 211). Generally, the end instruction from the administrator 620 is for finishing a program which the administrator 620 has entered by using the I/O terminal 150. If it is judged in Step 211 that the program end instruction has been received, the regular monitoring program 210 finishes the process. On the other hand, if it is judged in Step 211 that no program end instruction has been received, next Step 212 is executed.

Figure 8:
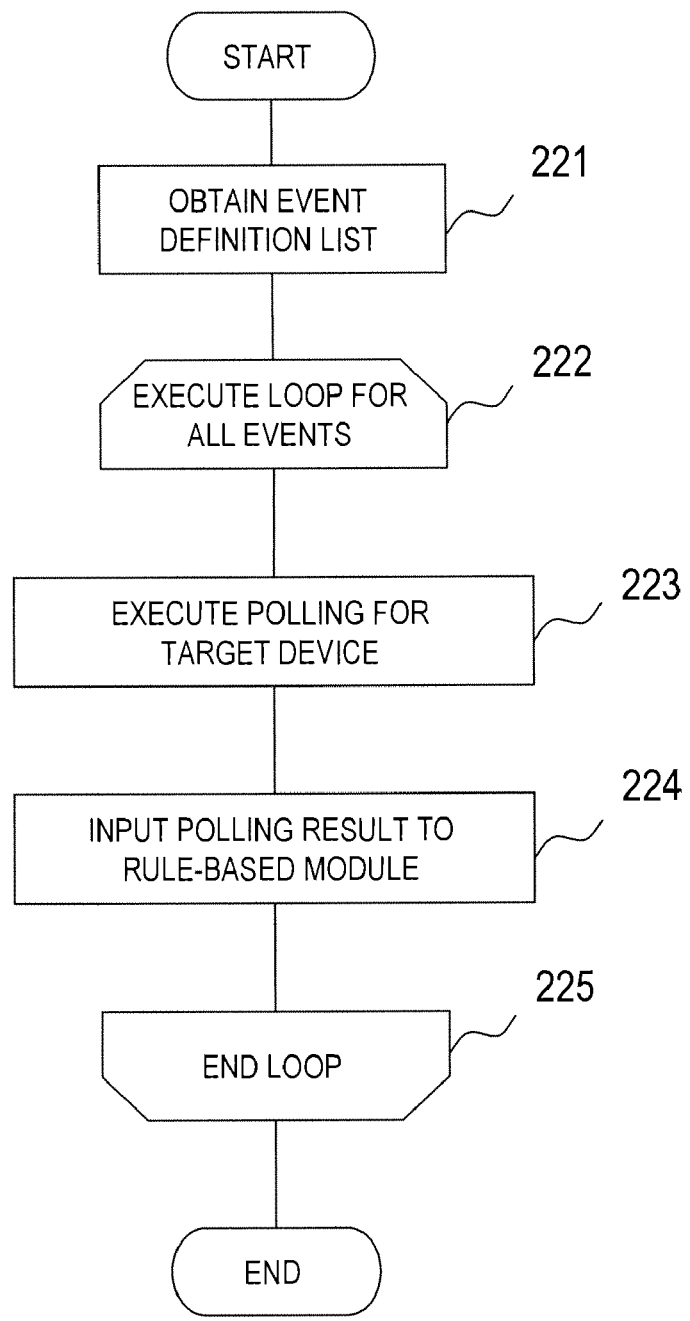
FIG. 8 is a flowchart illustrating processing of an overall information collection program according to the first embodiment of this invention.

In Step 212, the overall information collection program 220 is executed. Referring to FIG. 8, processing executed by the overall information collection program 220 will be described below.

Then, the regular monitoring program 210 executes WAIT processing (wait processing for program execution) for a predetermined time (e.g., 15 minutes) (Step 213). For this predetermined time, time shorter or longer than 15 minutes may be set.

The regular monitoring program 210 returns to Step 211 after execution of Step 213. Thereafter, the process is continued until an end instruction is received.

FIG. 8 is a flowchart illustrating processing of the overall information collection program 220 according to the first embodiment of this invention.

The overall information collection program 220 refers to the event definition table 250 to obtain an event definition list (Step 221).

The overall information collection program 220 executes loop processing through loop start processing (Step 222) and loop end processing (Step 225). Specifically, Steps 223 and 224 are executed for lines such as lines 253 to 256 of the event definition table 250.

In Step 223, the overall information collection program 220 executes polling to collect information for a management target device corresponding to an event. Specifically, for an IP address (e.g., IP address 2531) corresponding to an element (e.g., line 253) of the event definition table 250, information collection is carried out by using a set acquisition method (e.g., API set in the acquisition method 2532). If necessary, the overall information collection program 220 may use an ID 2533 and a PW 2534.

This polling may be realized by loading an OS standard API such as windows management instrumentation (WMI) for obtaining failure information and status information, or realized by calling an information collection program 716 via a LAN 600 for, for example, a target device 710.

In Step 224, the overall information collection program 220 generates input data based on a polling execution result of Step 223, and supplies the input data as input information to the rule-based module 300. This input information contains information indicating that an event defined in the event definition table 250 has been detected by polling. If no event has been detected by the polling, there is no need to supply the input information to the rule-based module 300. Upon reception of the input information, the rule-based module 300 executes inference processing.

An operation of the rule-based module 300 will be described. Processing executed by the rule-based module 300 is realized under control of processing executed by the rule interpreter program 350 with the rule base 370 set as a data reading source and the working memory 310 set as a data reading source and writing destination.

An operation of the rule interpreter program 350 will be described.

First, the rule interpreter program 350 reads a rule from the rule base 370, and saves read data on the working memory 310.

The rule interpreter program 350 executes rule matching for each of presumed items stored on the working memory 310 based on input information (input information supplied in Step 224) from the outside.

The rule interpreter program 350 judges whether applicable rules have been present in the matching processing. If no applicable rule has been present, the rule interpreter program 350 finishes the process. If applicable rules have been present, the rule interpreter program 350 selects a rule to be applied among the applicable rules to execute the selected rule. After the rule execution, control proceeds to the matching processing, and matching processing is repeated until an end for all the presumed items.

The operation of the rule interpreter program 350 is based on a general well-known technology in a field of artificial intelligence inference processing, and thus detailed description thereof will be omitted. For example, the detail is described in "Rule-based systems" by Frederick Hayes-Roth, Communications of ACM, Vol. 28, Issue 9 (September 1985), pages 921 to 932 cited in the background art of this invention.

The above-mentioned process enables detection of a failure or performance information of the management target device, and inference processing of a root cause.

A method by which the administrator 620 refers to an inferring result will be described.

First, the detection rate display program 410 is executed according to an instruction from the administrator 620. For example, upon operation of the display content update button 168 by the administrator 620, execution of the detection rate display program 410 may be started.

Figure 9:
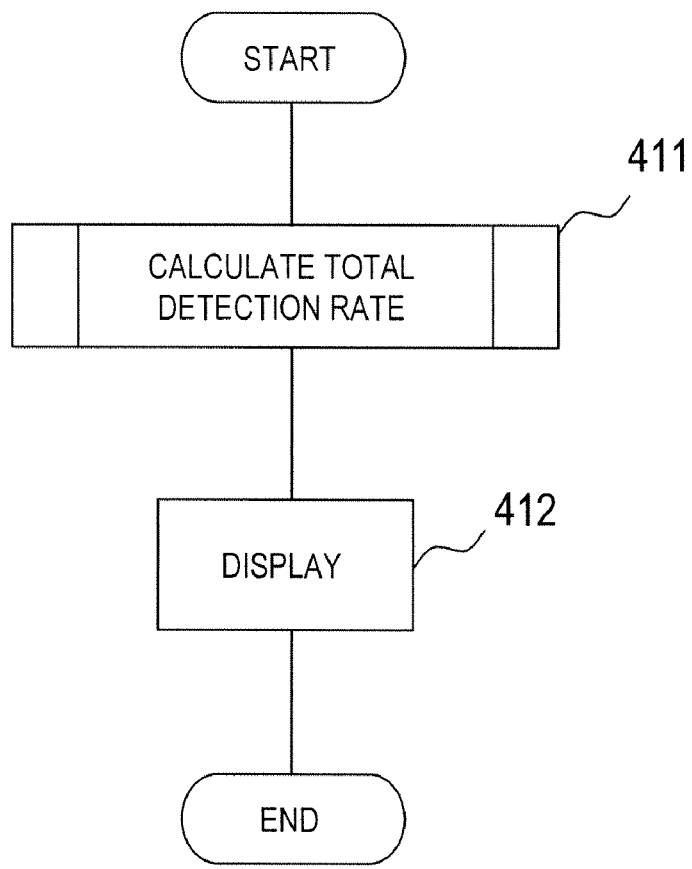
FIG. 9 is a flowchart illustrating processing of a detection rate display program according to the first embodiment of this invention.

FIG. 9 is a flowchart illustrating processing of the detection rate display program 410 according to the first embodiment of this invention.

Figure 10:
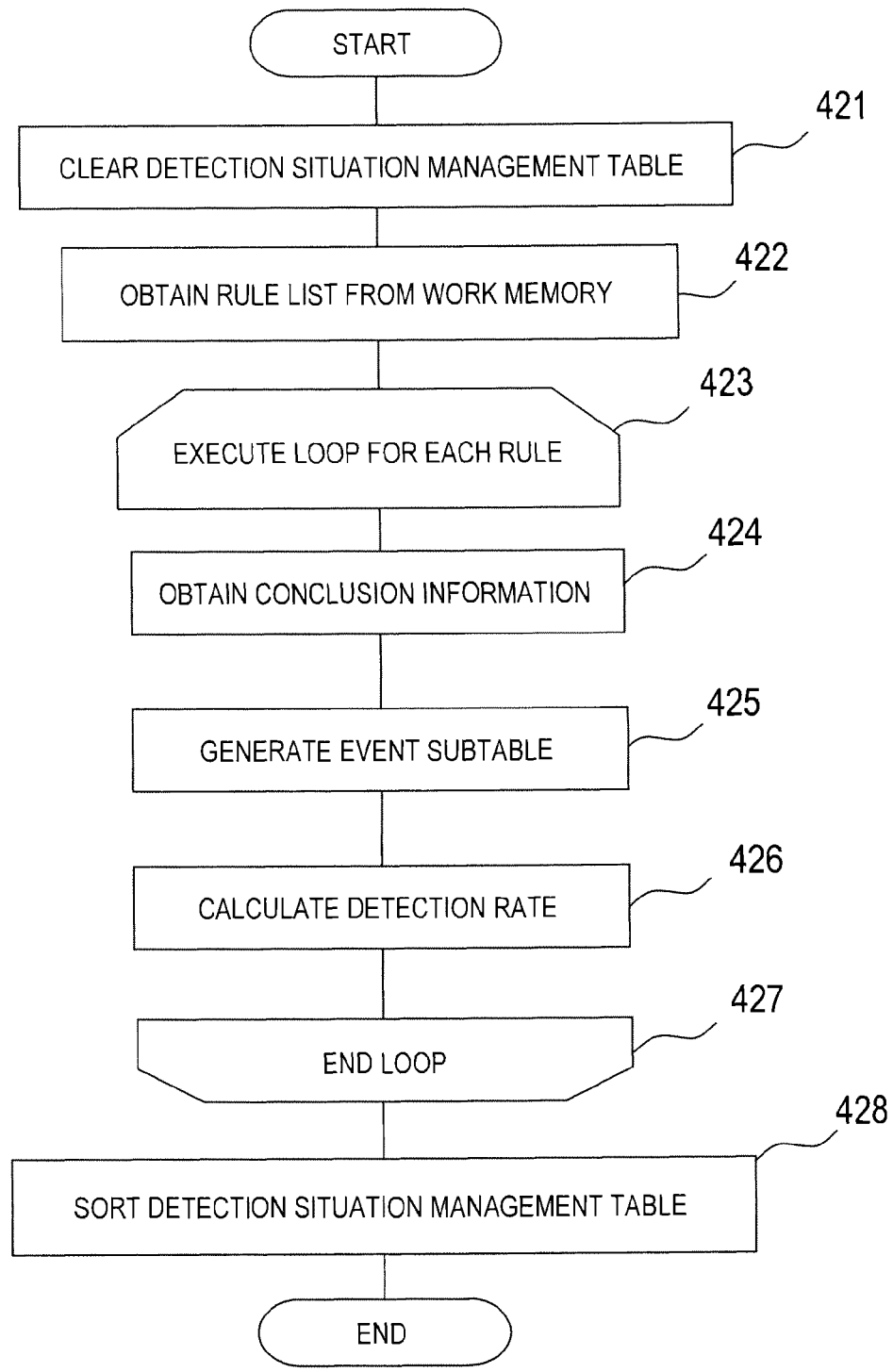
FIG. 10 is a flowchart illustrating processing of a total detection rate calculation program according to the first embodiment of this invention.

First, the detection rate display program 410 instructs execution of the total detection rate calculation program 420 (Step 411). The total detection rate calculation program 420 updates the detection situation management table 450. Referring to FIG. 10, the total detection rate calculation program 420 will be described below in detail.

Then, the detection rate display program 410 displays information of an inferring result on the GUI screen 160 based on information included in the detection situation management table 450 (Step 412).

The total detection rate calculation program 420 will be described. Processing of this program is for generating or updating the detection situation management table 450.

FIG. 10 is a flowchart illustrating processing of the total detection rate calculation program 420 according to the first embodiment of this invention.

First, the total detection rate calculation program 420 initializes the detection situation management table 450 (Step 421). In other words, if the detection situation management table 450 has been generated, the total detection rate calculation program 420 clears the table.

The total detection rate calculation program 420 obtains a list of rules (e.g., rules 1 and 2) from the working memory 310 (Step 422).

The total detection rate calculation program 420 executes loop processing through loop start processing (Step 423) and loop end processing (Step 427). Specifically, the total detection rate calculation program 420 executes Steps 424 to 426 for the rules (e.g., rules 1 and 2) of the list obtained from the working memory 310.

In Step 424, the total detection rate calculation program 420 generates a new line, e.g., 454, in the detection situation management table 450, and sets values in columns 451 and 452 of the line. Specifically, the total detection rate calculation program 420 extracts a value, for example, X of the conclusion ID column 261 based on the rule 1 to set the value in the column 451. Then, the total detection rate calculation program 420 finds a value of a conclusion message 262 corresponding to a value of a conclusion ID in the conclusion definition table 260 to set the value (e.g., "root cause is disk failure of storage device A") in the column 452.

In Step 425, the total detection rate calculation program 420 generates subdata (in the example of FIG. 5, subdata 460 and 470) indicating a detection situation of an event corresponding to each conclusion. Specifically, the total detection rate calculation program 420 extracts a list of events corresponding to each rule. For example, for the rule 1, events E1 and E3 are extracted. The total detection rate calculation program 420 generates lines (e.g., lines 463 and 464) corresponding to the extracted events, and values of event ID's are set in the column 461 of the lines.

The total detection rate calculation program 420 refers to the working memory 310, obtains a detection situation of each event from the column 312, and then sets a value of the obtained detection situation in the column 462. For example, if a value of the column 312 corresponding to an event ID "E1" is "T", "T" is set in the column 462 corresponding to the event ID "E1". Similarly, if a value of the column 312 is "F", "F" is set in the column 462. Lastly, the total detection rate calculation program 420 sets reference information to the subdata 460 in the column 453 of the detection situation management table 450.

In Step 426, the total detection rate calculation program 420 calculates a detection ratio of events included in the subdata. Specifically, the total detection rate calculation program 420 obtains a ratio of the number of detected events among the total number of events included in the subdata to set the value in the detection rate 469. For example, in the case of the subdata 460, the total number of included events is two, i.e., E1 and E3 (lines 463 and 464, respectively), and it is only E1 of the two that has been detected. Accordingly, "0.5" is set in the detection rate 469. On the other hand, for example, in the case of the subdata 470, the total number of included events is three, i.e., E1, E2, and E4 (lines 473, 464, and 475, respectively), and it is only E1 of the three that has been detected. Thus, "0.33" is set in the detection rate 479.

The detection rate may be calculated based on only the number of events as described above. However, the detection rate may be calculated by weighting each event.

In Step 428, the total detection rate calculation program 420 rearranges the lines of the detection situation management table 450 in the order of detection rates. In the example of FIG. 5, the total detection rate calculation program 420 compares values of the detection rates 469 and 479 with each other to rearrange the order of the lines so that a line corresponding to the detection rate with a larger value (line 454 corresponding to detection rate 469 of FIG. 5) can be higher in order than a line corresponding to the detection rate with a smaller value (line 455 corresponding to detection rate 479 of FIG. 5).

Through the above-mentioned process, the detection situation management table 450 is generated.

A control method for executing information collection earlier than usual to quickly establish an inferring result will be described. This control method achieves the task of this invention.

According to the embodiment, when inferring result re-evaluation is instructed, polling for immediately collecting information is executed for each device in addition to normal regular polling.

First, the re-evaluation program 430 is executed in accordance with an instruction from the administrator 620. For example, the administrator 620 refers to the GUI screen 160 to check an inferring result. The re-evaluation program 430 is executed by operating the inferring result re-evaluation button 169 when there is no established inferring result, or an established inferring result is different from that expected by the administrator 620.

Figure 11:
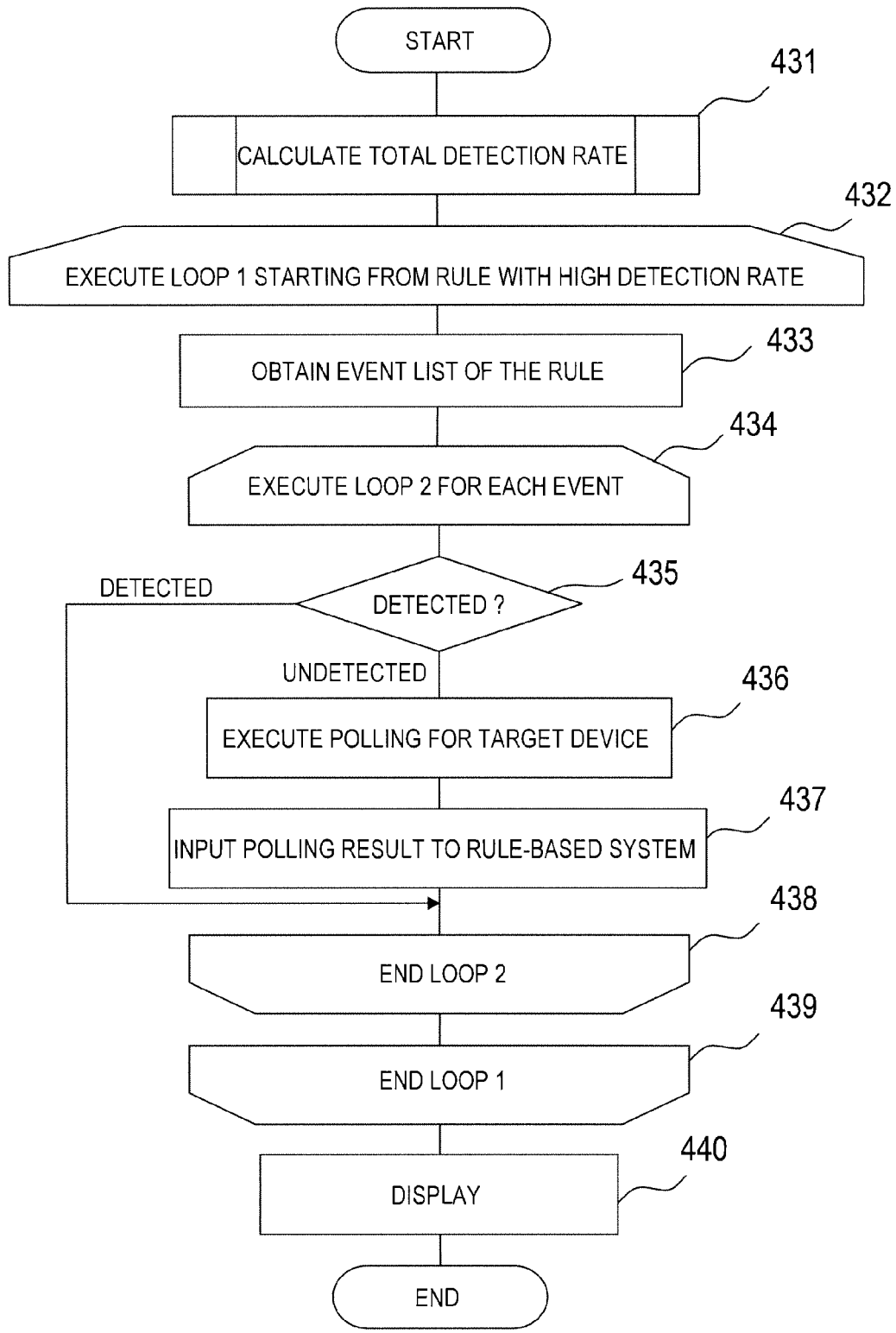
FIG. 11 is a flowchart illustrating processing of a re-evaluation program according to the first embodiment of this invention.

FIG. 11 is a flowchart illustrating processing of the re-evaluation program 430 according to the first embodiment of this invention.

First, the re-evaluation program 430 instructs execution of the total detection rate calculation program 420 to update the detection situation management table 450 (Step 431).

The re-evaluation program 430 executes loop processing through start processing of a loop 1 (Step 432) and end processing of the loop 1 (Step 439). Specifically, the re-evaluation program 430 executes Steps 433 to 438 for lines (e.g., lines 454 and 455) of the detection situation management table 450. Because the detection situation management table 450 is subjected to sorting in Step 428 of FIG. 10, this loop processing is executed in order starting from a rule corresponding to a high detection rate.

In Step 433, the re-evaluation program 430 obtains data of an event list corresponding to rules. For example, in the case of a rule of the line 454, the re-evaluation program 430 refers to the subdata 460 based on the column 453 to obtain lines 463 and 464.

The re-evaluation program 430 executes loop processing through start processing of a loop 2 (Step 434) and end processing of the loop 2 (Step 438). Specifically, the re-evaluation program 430 executes Steps 435 to 437 for events (e.g., events corresponding to the lines 463 and 464).

In Step 435, the re-evaluation program 430 refers to a value of the column 462 to judge whether each event (e.g., event corresponding to line 463) has been detected. If the event has not been detected, in other words, if a value is "F", the re-evaluation program 430 executes Steps 436 and 437.

In Step 436, the re-evaluation program 430 executes information collection (polling) for a device corresponding to an undetected event. Specifically, the re-evaluation program 430 executes information collection by using a corresponding acquisition method (e.g., refer to line 2532) for an IP address (refer to line 2531) corresponding to an undetected event in the event definition table 250. If necessary, a corresponding ID and a corresponding PW (e.g., refer to lines 2533 and 2534) may be used.

The polling executed in Step 436 is executed at timing other than timing of regular polling shown in FIGS. 7 and 8. Hereinafter, such polling may be referred to as special polling.

In Step 437, the re-evaluation program 430 generates input data based on an execution result of the information collection processing to supply it as input information to the rule-based module 300. If no event is detected by the polling, there is no need to supply the input information to the rule-based module 300.

Upon completion of all of the loop processing of Steps 434 to 438 and the loop processing of Steps 432 to 439, the re-evaluation program 430 displays information of an inferring result on the GUI screen 160 based on information of the detection situation management table 450 in Step 440.

The display content update button 168 and the inferring result re-evaluation button 169 are set inactive during processing of the re-evaluation program 430. In other words, the administrator 620 cannot operate any buttons until completion of the processing. When the buttons become active again, the administrator 620 can know completion of the processing of the requested re-evaluation program 430.

The above-mentioned method enables, in the operation management system equipped with a rule-based inference processing function, quick establishment of an inferring result without waiting for timing of next regular polling.

The re-evaluation program 430 may be executed according to an instruction from the administrator 620 as described above. However, the re-evaluation program 430 may be regularly executed in the management server 100. Alternatively, when the management server 100 detects a certain event, for example, the re-evaluation program 430 may be executed immediately after Step 224.

Referring to a data structure of FIG. 26 and a flowchart of FIG. 27, a procedure of executing the re-evaluation program 430 at various timings will be described.

FIG. 26 illustrates a format of the re-evaluation execution condition table 900 according to the first embodiment of this invention.

The re-evaluation execution condition table 900 includes a re-evaluation execution condition column 901, and a T/F column 902. Thus, a re-evaluation execution condition and a satisfaction situation indicating whether the condition has been satisfied are managed.

In the column 901, a condition for judging whether process of the re-evaluation program 430 is executed. In an example of FIG. 26, in the column 901, "passage of predetermined time", "execution instruction by user", and "event detection" are set (lines 905, 906, and 907, respectively).

In the column 902, a value indicating whether the condition set in the column 901 is satisfied. Specifically, if the condition set in the column 901 is satisfied, "T" is set in the column 902 corresponding to the condition. On the other hand, if the condition set in the column 901 is not satisfied, "F" is set in the column 902 corresponding to the condition.

If at least one of a plurality of conditions set in the column 901 is satisfied, processing of the re-evaluation program 430 is executed.

According to the line 905, for example, a condition is satisfied after a passage of predetermined time from the previous processing of the re-evaluation program 430 by a timer, "T" is set in the column 902.

Predetermined time set in the line 905 has to be shorter than a regular polling execution interval (wait time of Step 213 of FIG. 7). For example, if a regular polling execution interval is 15 minutes, predetermined time set in the line 905 may be 5 minutes.

In this case, polling is executed for all the events included in all the rules at a 15-minute interval. Then, at a 5-minute interval, special polling is executed for undetected events included in a rule where at least one event has been detected (in the example of FIG. 5, undetected event E3 included in rule 1 where event E1 has been detected, and undetected events E2 and E4 included in rule 2 where event E1 has been detected).

As a computer system targeted for operation management is larger, the number of events included in all rules is larger. Accordingly, time for one regular polling is longer. However, it is only a tiny part of the events that is actually detected. Thus, as special polling execution interval, time shorter than a regular polling execution interval can be set.

According to the line 906, for example, a condition is established when the administrator 620 enters a re-evaluation execution instruction, and "T" is set in the column 902.

According to the line 907, a condition is established when the management server 100 detects a predetermined event, for example, when a failure event is detected by Step 224, and "T" is set in the column 902.

The automatic re-evaluation execution program 920 is executed according to an instruction from the administrator 620, whereby the re-evaluation program 430 is executed at various timings.

Figure 27:
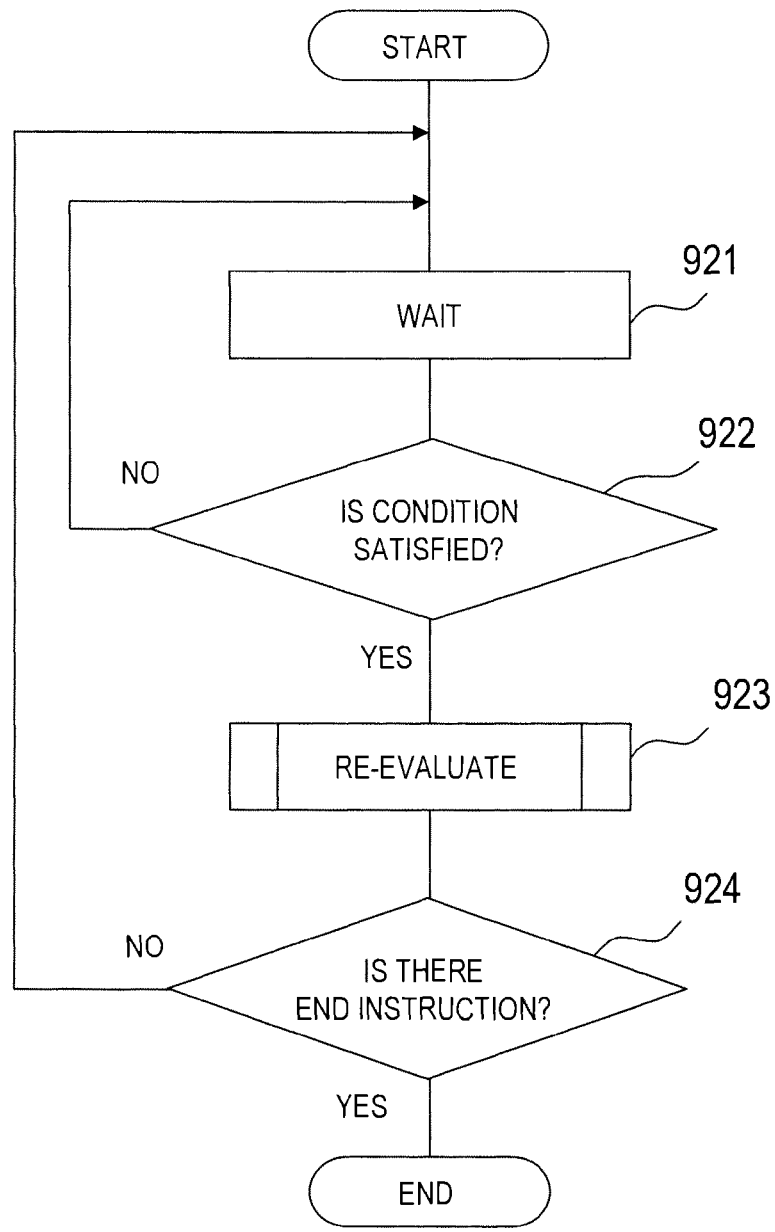
FIG. 27 is a flowchart illustrating processing of an automatic re-evaluation execution program according to the first embodiment of this invention.

FIG. 27 is a flowchart illustrating processing of the automatic re-evaluation execution program 920 according to the first embodiment of this invention.

The automatic re-evaluation execution program 920 executes WAIT processing (wait processing for program execution) for a predetermined time such as 10 seconds (Step 921). This predetermined time may be shorter or longer than 10 seconds.

In Step 922, the automatic re-evaluation execution program 920 judges whether a condition for executing re-evaluation processing has been satisfied. Specifically, the automatic re-evaluation execution program 920 refers to the re-evaluation execution condition table 900 to judge whether there is a line having a value of the column 902 set to "T".

If there is no line having a value of the column 902 set to "T", the process returns to Step 921. On the other hand, if there is a line having a value of the column 902 set to "T", the automatic re-evaluation execution program 920 sets "F" in the column 902 of the corresponding line to proceed to Step 923.

In Step 923, the re-evaluation program 430 is executed.

Then, in Step 924, the automatic re-evaluation execution program 920 judges whether the administrator has entered an end instruction. Generally, the end instruction from the administrator is a program end instruction entered from the I/O terminal 150.

If it is judged in Step 924 that a program end instruction has been entered, processing of the automatic re-evaluation execution program 920 is finished. On the other hand, if it is judged in Step 924 that no program end instruction has been entered, the process returns to Step 921.

The above-mentioned method enables execution of the re-evaluation program 430 at timing other than that of operating the inferring result re-evaluation button 169 by the administrator 620.

For example, when a disk failure occurs in the storage device A 730, events E1 and E3 should be detected (refer to rule 1). These events are detected by regular polling shown in FIGS. 7 and 8. However, because polling operations are executed in order for the devices, events simultaneously occurring in the plurality of devices cannot be detected at the same time.

For example, if the process of FIG. 8 is called in Step 212 of FIG. 7, the event E1 is not detected during first execution of the loop of Steps 222 to 225, but the event E3 is detected during second execution, a disk failure may have occurred in the storage device A 730 between the first execution and the second execution. However, even if a disk failure has occurred in the storage device A 730, its conclusion is not established until, after a passage of wait time (e.g., 15 minutes) of Step 213 upon completion of the loop processing of Steps 222 to 225, the loop of Steps 222 to 225 is executed again to detect the event E1.

According to the embodiment, however, even before a passage of wait time of Step 213 (i.e., before next regular polling is executed), if a predetermined condition (in the embodiment, condition defined in re-evaluation execution condition table 900) is satisfied, the re-evaluation program 430 executes special polling. Thus, a conclusion can be established before execution of next regular polling.

Specifically, for example, if only the event E1 of the events E1 and E3 included in the rule 1 is detected as described above, special polling may be executed to detect the event E3 after a passage of predetermined time (e.g., 5 minutes) shorter than an execution interval of the regular polling (line 905). Alternatively, upon reception of an instruction from a user, special polling may be executed without waiting for next regular polling (line 906). Alternatively, upon detection of the event E1, special polling may immediately be executed without waiting for next regular polling (line 907). As a result, the event E3 can be detected earlier to enable early establishment of the conclusion.

It should be noted that reasoning under uncertainty can be applied to the embodiment. The reasoning under uncertainty is an inferring method when knowledge or conviction is uncertain. Representative reasoning under uncertainty is an inferring method which uses, for example, fuzzy inference or a certainty factor value of MYCIN.

Figure 12:
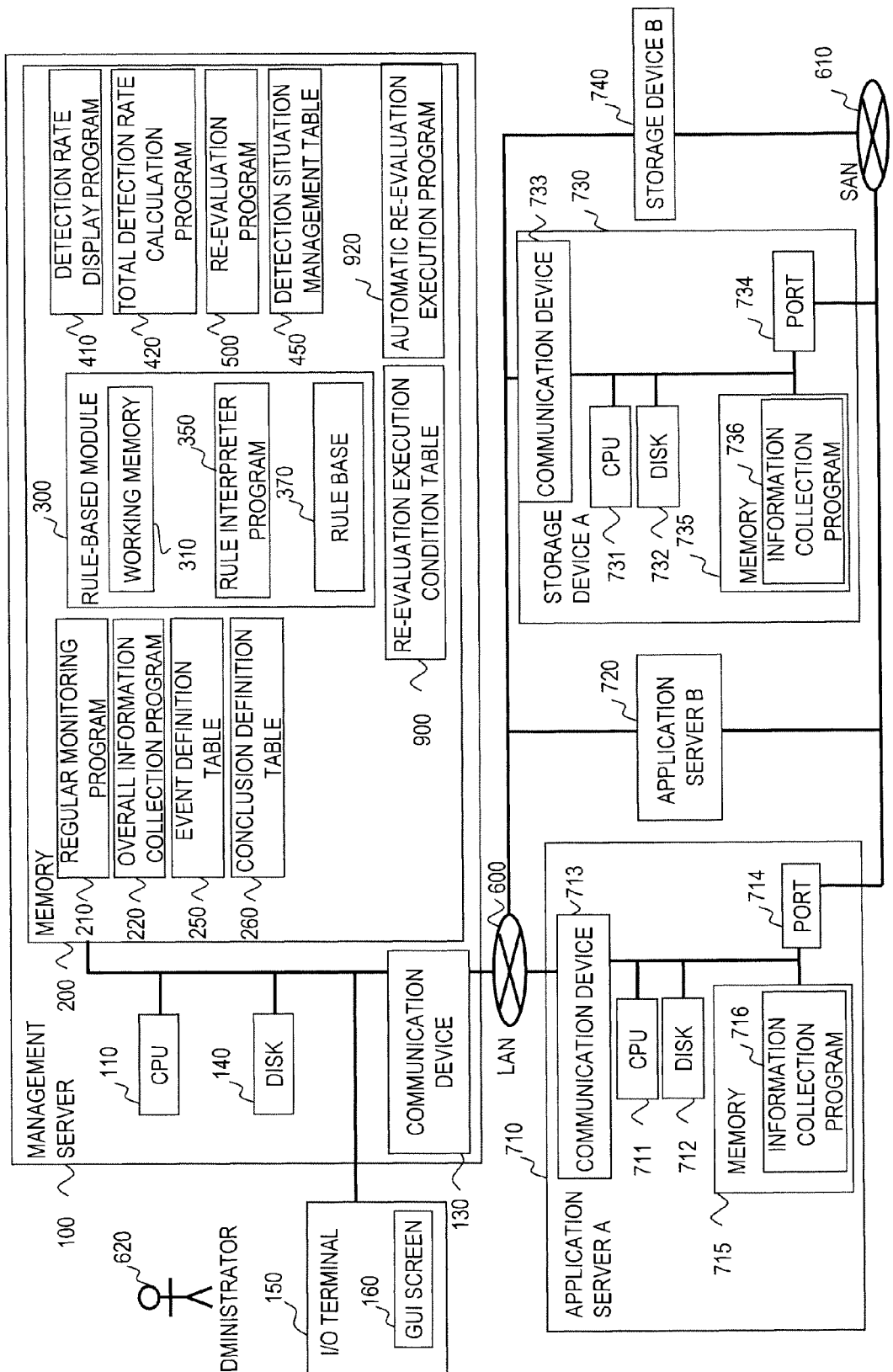
FIG. 12 is a block diagram illustrating a configuration of an operation management system according to a second embodiment of this invention.
Figure 13:
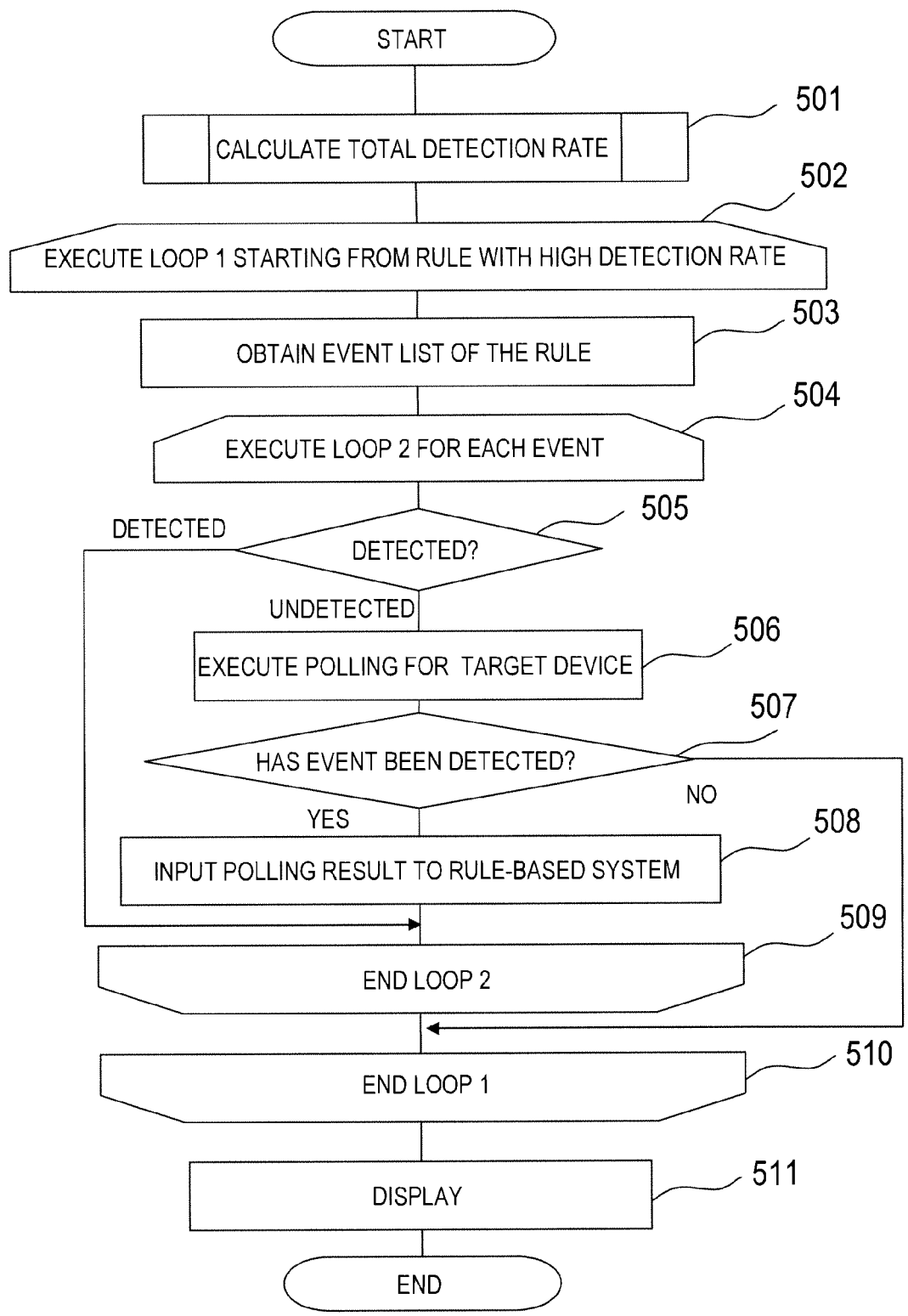
FIG. 13 is a flowchart illustrating processing of a re-evaluation program according to the second embodiment of this invention.

Referring to FIGS. 12 and 13, a second embodiment of this invention will be described. The second embodiment corresponds to a modified example of the first embodiment.

According to the first embodiment, through the processing of the re-evaluation program 430, based on the detection situation management table 450, the special polling different from the regular polling is immediately executed for the device where an event is undetected. However, when special polling is executed for all the devices where events are undetected, processing time thereof delays establishment of an inferring result.

According to the first embodiment, special polling is executed for all the devices with undetected events which become conclusion elements. However, unless at least one of the plurality of events included in one rule is detected, irrespective of whether the remaining events are detected, a conclusion corresponding to the rule is not established. In other words, at the time of finding that at least one of the plurality of events is not detected, unestablishment of a conclusion corresponding to the rule can be judged without executing polling for the remaining events.

Thus, according to the second embodiment, while a re-evaluation program 500 executes special polling targeting an undetected event among events corresponding to a certain conclusion, if a target event is not detected during the special polling, special polling for the other events corresponding to the conclusion is canceled (in other words, special polling for the remaining events corresponding to the conclusion is not executed).

FIG. 12 is a block diagram illustrating a configuration of an operation management system according to the second embodiment of this invention.

The second embodiment is different from the first embodiment in that the re-evaluation program 430 of the management server 100 is replaced by the re-evaluation program 500. Differences of the second embodiment from the first embodiment will be described below.

According to the embodiment, the re-evaluation program 500 is executed in accordance with an instruction from an administrator 620. For example, the administrator 620 refers to a GUI screen 160 to check an inferring result. If there is no established inferring result, or if an inferring result different from that expected by the administrator 620 is established, the administrator 620 operates an inferring result re-evaluation button 169 to execute the re-evaluation program 500.

FIG. 13 is a flowchart illustrating processing of the re-evaluation program 500 according to the second embodiment of this invention.

First, in Step 501, the re-evaluation program 500 instructs execution of a total detection rate calculation program 420. A detection situation management table 450 is updated by the total detection rate calculation program 420.

The re-evaluation program 500 executes loop processing through start processing of a loop 1 (Step 502) and end processing of the loop 1 (Step 510). Specifically, the re-evaluation program 500 executes Steps 503 to 509 for lines (e.g., lines 454 and 455) of the detection situation management table 450. Because the detection situation management table 450 is subjected to sorting in Step 428 of FIG. 10, this loop processing is executed in order starting from a rule corresponding to a high detection rate.

In Step 503, the re-evaluation program 500 obtains data of an event list corresponding to rules. For example, in the case of a rule of the line 455, the re-evaluation program 500 refers to the subdata 470 based on the column 453 to obtain lines 473, 474, and 475.

The re-evaluation program 500 executes loop processing through start processing of a loop 2 (Step 504) and end processing of the loop 2 (Step 509). Specifically, the re-evaluation program 500 executes Steps 505 to 508 for events (e.g., events corresponding to the line 473).

In Step 505, the re-evaluation program 500 refers to a value of the column 472 to judge whether each event (e.g., event corresponding to line 473) has been detected. If the event has not been detected, in other words, if a value is "F", the re-evaluation program 500 executes Steps 506 to 508.

In Step 506, the re-evaluation program 500 executes information collection (polling) for a device corresponding to an undetected event. Specifically, the re-evaluation program 500 executes information collection by using a corresponding acquisition method for an IP address corresponding to an undetected event in the event definition table 250. If necessary, a corresponding ID and a corresponding PW may be used.

In Step 507, the re-evaluation program 500 judges whether an event has been detected as a result of Step 506. For example, if information collection is executed for a line 474 of the subdata 470 in Step 506, the re-evaluation program 500 judges whether E2 which is an event of the line 474 has been detected. If the event has not been detected, the re-evaluation program 500 proceeds to end processing 510 of the loop 1 without executing end processing of the loop 2 (Step 509) (in other words, by canceling the loop processing of Steps 504 to 509).

For example, when processing of FIG. 13 is executed after detection of only E1 among the events E1, E2, and E4 corresponding to the conclusion Y of FIG. 5, polling is executed for the event E2 in Step 506, and whether the event E2 has been detected is judged in Step 507. In this case, when the event E2 has not been detected, even if polling is further executed for the event E4, there is no possibility that the conclusion Y will be established. Thus, according to the embodiment, further execution of polling corresponding to a conclusion with no possibility to be established (in the aforementioned example, execution of polling for the event E4) is omitted. In other words, polling for the event E4 is not executed at least until polling is executed again for the event E2 at next polling.

In Step 508, the re-evaluation program 500 generates input data based on an execution result of information collection processing to supply it as input information to a rule-based module 300. If no event is detected by polling, there is no need to supply the input information to the rule-based module 300.

Upon completion of all of the loop processing of Steps 504 to 509 and the loop processing of Steps 502 to 510, in Step 511, the re-evaluation program 500 displays information of an inferring result on the GUI screen 160 based on information of the detection situation management table 450.

The rest of the processing of the second embodiment is similar to that of the first embodiment, and thus description thereof will be omitted.

According to the embodiment, in the operation management system equipped with the rule-based inference processing function, an inferring result can be quickly established without waiting for timing of next regular polling. According to the embodiment, when it is obvious that a conclusion is not established even if polling is executed as described above, the execution of polling is omitted. Thus, according to the embodiment, an inferring result can be established more quickly than that in the case of the first embodiment.

Figure 14:
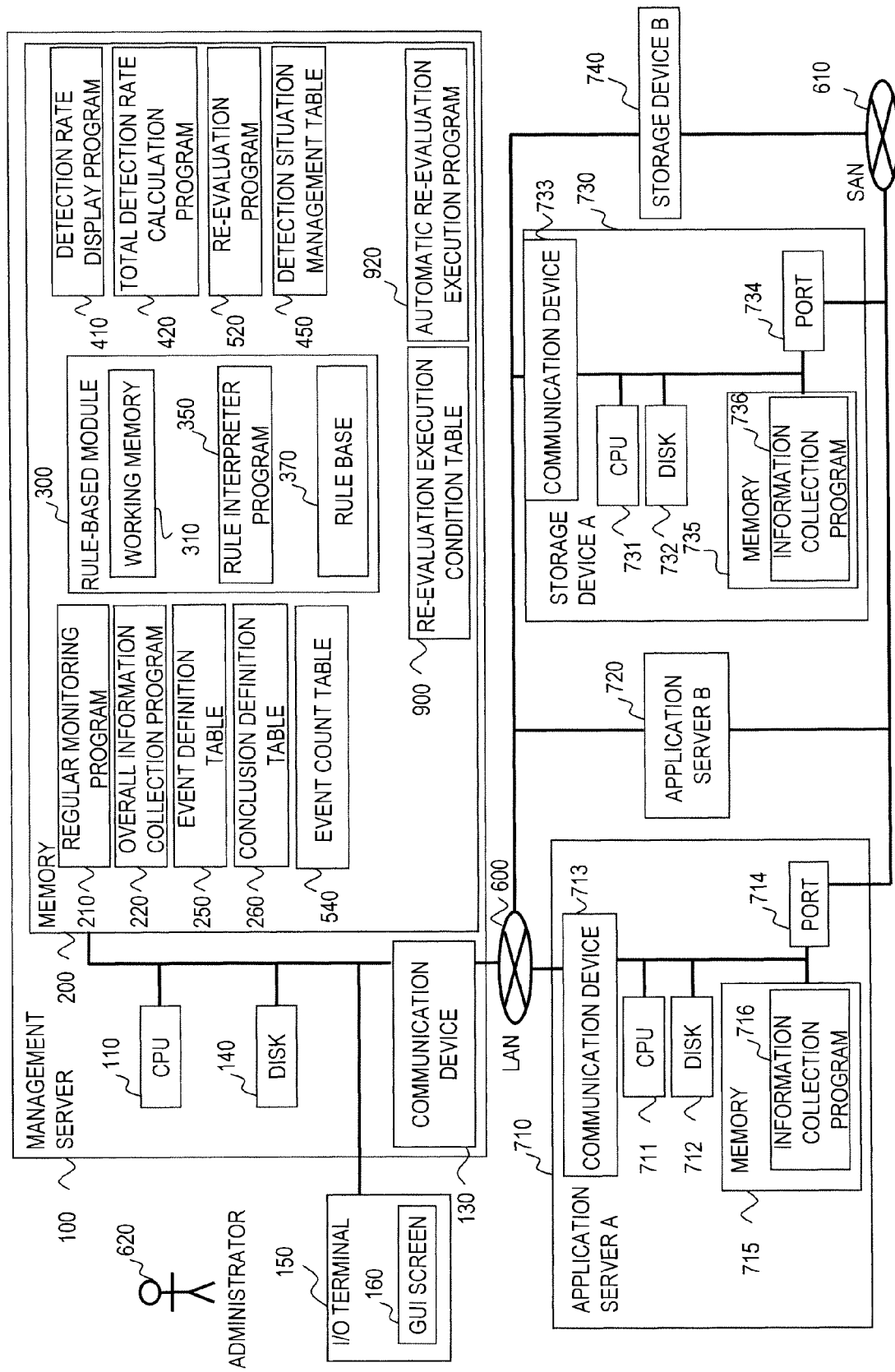
FIG. 14 is a block diagram illustrating a configuration of an operation management system according to a third embodiment of this invention.
Figure 16:
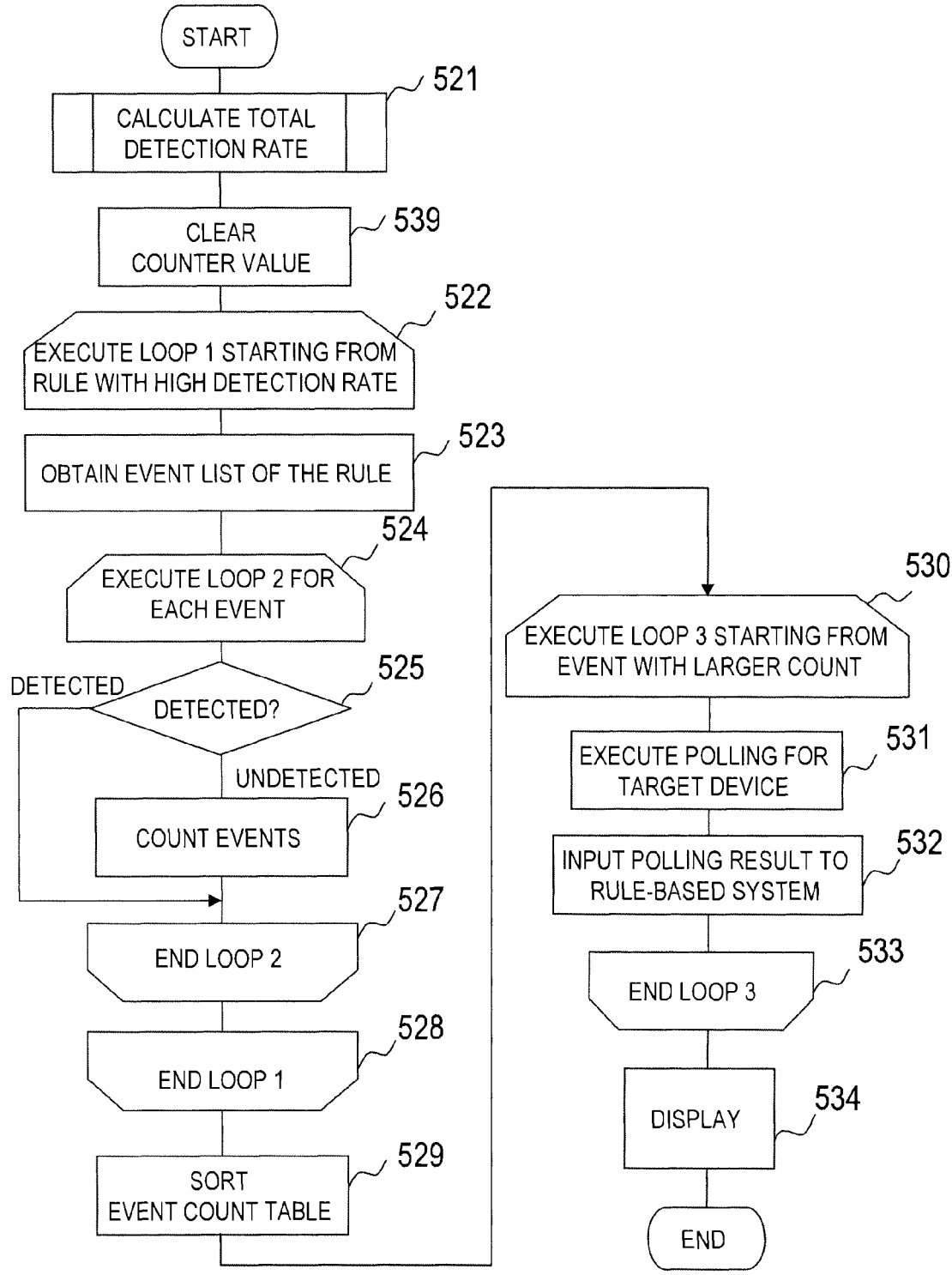
FIG. 16 is a flowchart illustrating processing of a re-evaluation program according to the third embodiment of this invention.

Referring to FIGS. 14 to 16, a third embodiment of this invention will be described. The third embodiment corresponds to a modified example of the first embodiment.

According to the first embodiment, through the processing of the re-evaluation program 430, the special polling is immediately executed for the device with an undetected event based on the detection situation management table 450. However, if an event defined in an if-conditional sentence is defined in a plurality of rules, according to the first embodiment, special polling is executed a plurality of times for the same event. Processing time for the special polling delays establishment of an inferring result.

Thus, according to the third embodiment, events targeted for special polling are counted first by a re-evaluation program 520 and an event count table 540. Then, special polling is executed in order starting from an event with a larger count. Accordingly, repetition of special polling is prevented. Moreover, events included in more rules are preferentially subjected to special polling.

FIG. 14 is a block diagram illustrating a configuration of an operation management system according to the third embodiment of this invention.

The third embodiment is different from the first embodiment in that the re-evaluation program 430 of the management server 100 is replaced by a re-evaluation program 520, and an event count table 540 is added. Differences of the third embodiment from the first embodiment will be described below.

FIG. 15 illustrates a format of the event count table 540 according to the third embodiment of this invention.

The event count table 540 includes an event ID column 541 and a count column 542. Accordingly, events to be subjected to special polling and the number of rules including the events are managed. An event E5 present in the event ID of a line 546 is not defined in the embodiment. However, the event E5 is added for convenience of describing characteristics of the event count table 540. Description of definition of the event E5 is omitted.

In an example of FIG. 15, each of events E2, E3, and E4 is counted once (lines 543, 544, and 545, respectively). On the other hand, the event E5 is counted twice (line 546). In this case, the events E2, E3, E4, and E5 are undetected, each of the events E2, E3, and E4 is included in an if-conditional sentence of one rule, and the event E5 is included in if-conditional sentences of two rules.

According to the embodiment, the re-evaluation program 520 is executed in accordance with an instruction from an administrator 620. For example, the administrator 620 refers to a GUI screen 160 to check an inferring result. If an established inferring result is not present, or if the established inferring result is different from that expected by the administrator 620, the administrator 620 operates an inferring result re-evaluation button 169 to execute the re-evaluation program 520.

FIG. 16 is a flowchart illustrating processing of the re-evaluation program 520 according to the third embodiment of this invention.

First, in Step 521, the re-evaluation program 520 instructs execution of a total detection rate calculation program 420. A detection situation management table 450 is updated by the total detection rate calculation program 420.

Next, in Step 539, the re-evaluation program 520 clears a counter of the event count table 540. Specifically, the re-evaluation program 520 sets "0" in the column 542 of all lines of the event count table 540.

Next, the re-evaluation program 520 executes loop processing through start processing of a loop 1 (Step 522) and end processing of the loop 1 (Step 528). Specifically, the re-evaluation program 520 executes Steps 523 to 527 for lines (e.g., lines 454 and 455) of the detection situation management table 450.

In Step 523, the re-evaluation program 520 obtains data of event list corresponding to a rule indicated by each line of the detection situation management table 450. For example, in the case of a rule of the line 454, subdata 460 is referred to based on a column 453 to obtain lines 463 and 464.

The re-evaluation program 520 executes loop processing through start processing of a loop 2 (Step 524) and end processing of the loop 2 (Step 527). Specifically, the re-evaluation program 520 executes Steps 525 to 526 for each event (e.g., event corresponding to line 463).

In Step 525, the re-evaluation program 520 refers, for each event (e.g., event corresponding to line 463), to a value of a column 462 to judge whether the event has been detected. If the event has not been detected (e.g., value of column 462 is "F"), the re-evaluation program 520 executes Step 526.

In Step 526, the re-evaluation program 520 counts events. Specifically, the re-evaluation program 520 refers to the event count table 540 to add "1" to a value in the column 542 of the line corresponding to the event judged to have been undetected in Step 525.

In Step 529, the re-evaluation program 520 sorts (rearranges) lines of the event count table 540. Specifically, the lines of the event count table 540 are sorted in order starting from lines with larger values of the count column 542.

For example, if the event count table 540 is as shown in FIG. 15 at the end time of Step 528, a value "2" of the count column 542 of the event E5 is largest (line 546). In this case, in Step 529, the line 546 of the event E5 moves to a head of the event count table 540.

The re-evaluation program 520 executes loop processing through start processing of a loop 3 (Step 530) and end processing of the loop 3 (Step 533). Specifically, the re-evaluation program 520 executes Steps 531 and 532 for the lines in order from the head line of the event count table 540. Because the event count table 540 has been sorted in Step 529, the re-evaluation program 520 executes Steps 531 and 532 preferentially for a line with a larger value of the count column 542.

In Step 531, the re-evaluation program 520 executes polling for information collection for a device corresponding to an event indicated by each line of the event count table 540.

Specifically, the re-evaluation program 520 executes polling for an IP address corresponding to each event of the event definition table 250 by using a corresponding acquisition method. If necessary, a corresponding ID and a corresponding PW may be used.

In Step 532, the re-evaluation program 520 generates input data based on an execution result of the polling to supply it as input information to a rule-based module 300. This input information contains information indicating that an event defined in the event definition table 250 has been detected by polling. If no event is detected by the polling, there is no need to supply the input information to the rule-based module 300.

In Step 534, the re-evaluation program 520 displays information of an inferring result on the GUI screen 160 based on information of the detection situation management table 450.

The rest of the processing of the third embodiment is similar to that of the first embodiment, and thus description thereof will be omitted.

According to the third embodiment, in the operation management system equipped with the rule-based inference processing function, an inferring result can be quickly established without waiting for timing of next regular polling. According to the third embodiment, repetition of polling for the same device is omitted. According to the third embodiment, polling for an event included in more rules is preferentially executed (in other words, before polling for an event included in less rules). Thus, the inferring result can be established more efficiently and quickly than the first embodiment.

Referring to FIGS. 17 to 22, a fourth embodiment of this invention will be described. The fourth embodiment corresponds to a modified example of the third embodiment.

According to the third embodiment, through the processing of the re-evaluation program 520, repetition of special polling is omitted based on the detection situation management table 450 and the event count table 540 to execute special polling preferentially from an event included in more rules.

However, because the special polling may be executed simultaneously with normal regular polling, loads temporarily concentrate on the management server 100.

Thus, according to the fourth embodiment, control is performed to prevent simultaneous execution of special polling with regular polling by a re-evaluation program 560, a polling task generation program 810, a polling task execution program 820, and a polling task queue 850, thereby maintaining constant polling processing loads of the management server 100.

Figure 17:
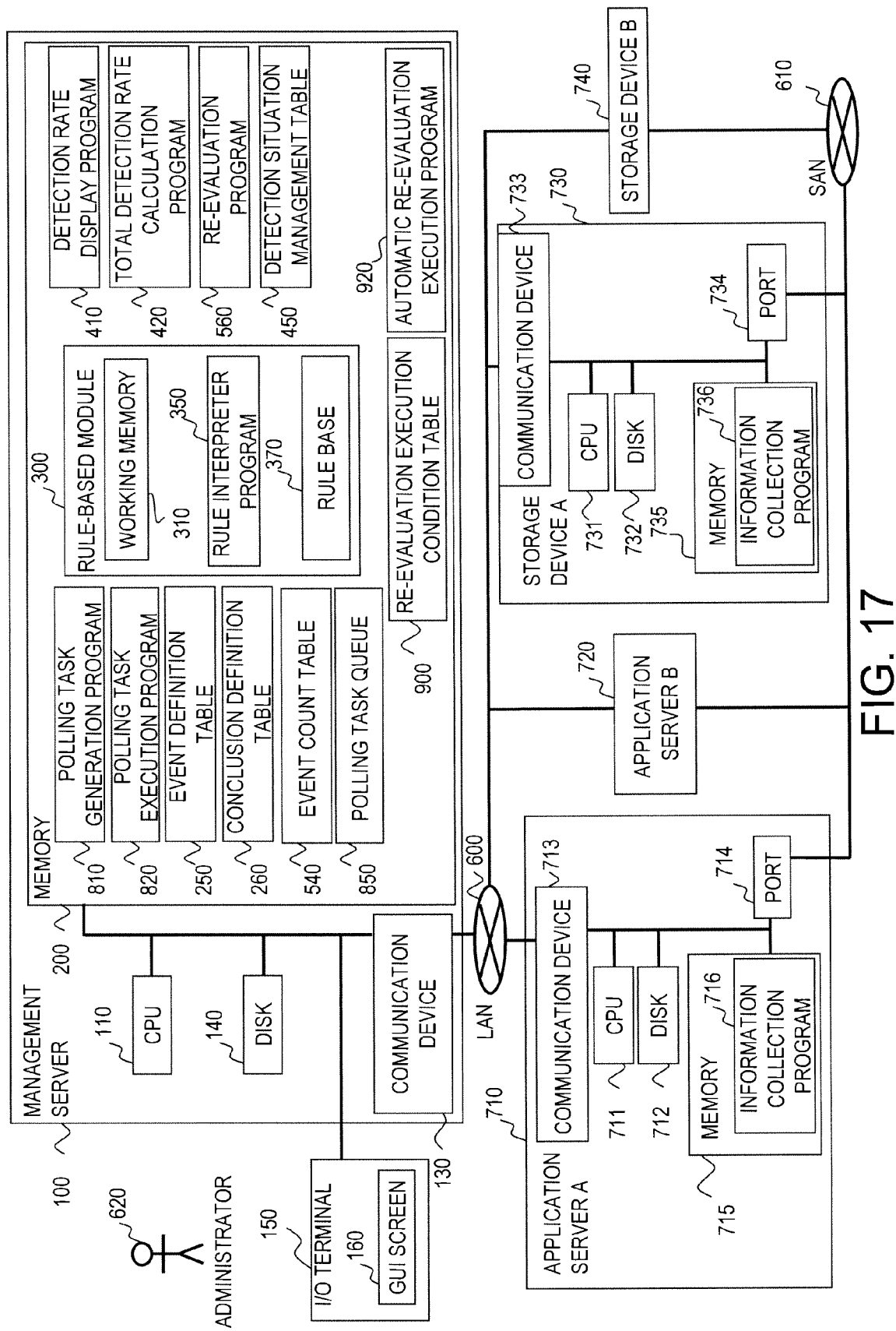
FIG. 17 is a block diagram illustrating a configuration of an operation management system according to a fourth embodiment of this invention.

FIG. 17 is a block diagram illustrating a configuration of an operation management system according to the fourth embodiment of this invention.

The fourth embodiment is different from the third embodiment in that the re-evaluation program 520 of the management server 100 is replaced by the re-evaluation program 560, the regular monitoring program 210 and the overall information collection program 220 are replaced by the polling task generation program 810 and the polling task execution program 820, and the polling task queue 850 is added.

FIG. 18 illustrates a format of the polling task queue 850 according to the fourth embodiment of this invention.

The polling task queue 850 is a table which includes an order column 851 and an event ID column 852, and used for setting an order of tasks to execute polling. This queue is based on a first-in first-out (FIFO) format, and a task to be added is basically added to a tail of the queue. One line of the polling task queue 850 corresponds to one task. When tasks are taken out from the queue for executing tasks, the tasks are taken out in order starting from the head (task where a value of order column 851 is 1). However, a task with higher priority can be added to the head of the queue. Moreover, an order of elements of the queue can be changed.

In an example of FIG. 18, "E1", "E2", "E3", and "E4" are respectively set in the event ID column 852 corresponding to values "1", "2", "3", and "4" of the order column 851 (lines 853, 854, 855, and 856, respectively). In this case, polling is executed in order of the events E1, E2, E3, and E4.

Figure 19:
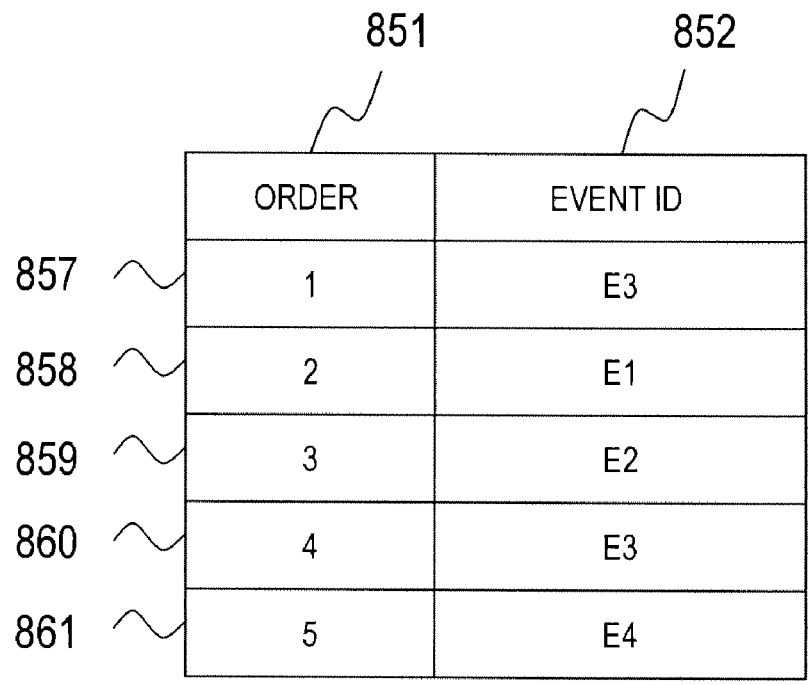
FIG. 19 illustrates an example of the polling task queue at a certain time point in the middle of execution of a re-evaluation program according to the fourth embodiment of this invention.

FIG. 19 illustrates an example of the polling task queue 850 at a certain time point in the middle of execution of the re-evaluation program 560 according to the fourth embodiment of this invention.

In an example of FIG. 19, "E3", "E1", "E2", "E3", and "E4" are respectively set in the event ID column 852 corresponding to values "1", "2", "3", "4", and "5" of the order column 851 (lines 857, 858, 859, 860, and 861, respectively). In this case, polling is executed in order of the events E3, E1, E2, E3, and E4.

According to the embodiment, first, the polling task generation program 810 is executed according to an instruction entered from an administrator 620.

Figure 20:
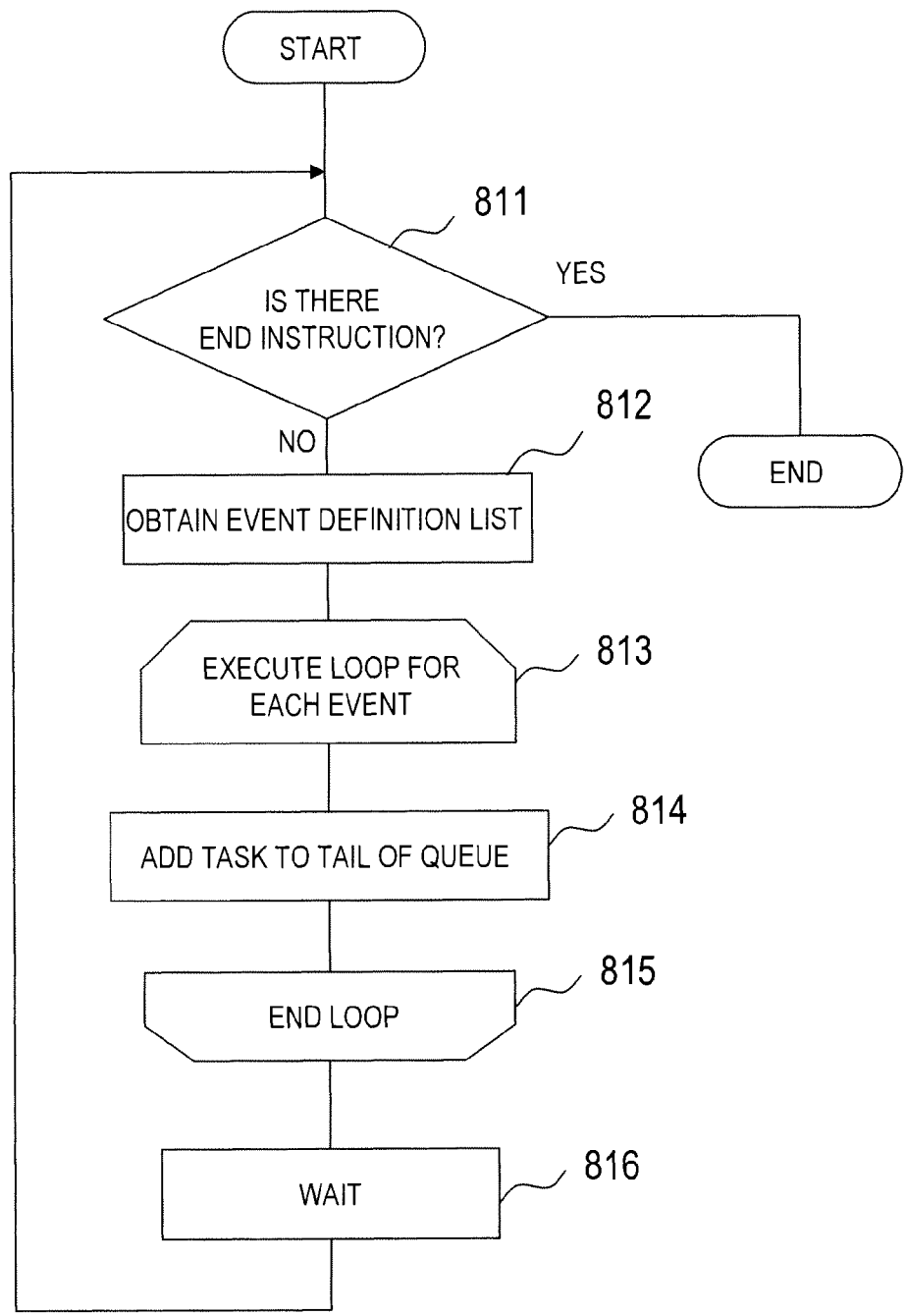
FIG. 20 is a flowchart illustrating processing of a polling task generation program according to the fourth embodiment of this invention.

FIG. 20 is a flowchart illustrating processing of the polling task generation program 810 according to the fourth embodiment of this invention.

First, in Step 811, the polling task generation program 810 judges whether an end instruction has been received from the administrator 620. Generally, the end instruction from the administrator 620 is a program end instruction which the administrator 620 enters by using an I/O terminal 150. If it is judged in Step 811 that the program end instruction has been received, the polling task generation program 810 finishes the process. On the other hand, if it is judged in Step 811 that no program end instruction has been received, next Step 812 is executed.

In Step 812, the polling task generation program 810 refers to an event definition table 250 to obtain an event definition list.

The polling task generation program 810 executes loop processing through loop start processing (Step 813) and loop end processing (Step 815). Specifically, the polling task generation program 810 executes Step 814 for lines such as lines 253 to 256 of the event definition table 250.

In Step 814, the polling task generation program 810 adds an event corresponding to each line of the event definition table 250 to a tail of the polling task queue 850.

In Step 816, the polling task generation program 810 executes WAIT processing (wait processing for program execution) for a predetermined time (e.g., 15 minutes). This predetermined time may be shorter or longer than 15 minutes.

After execution of Step 816, the process returns to Step 811 to be continued until reception of an end instruction.

According to the embodiment, the polling task execution program 820 is then executed according to an instruction from the administrator 620.

Figure 21:
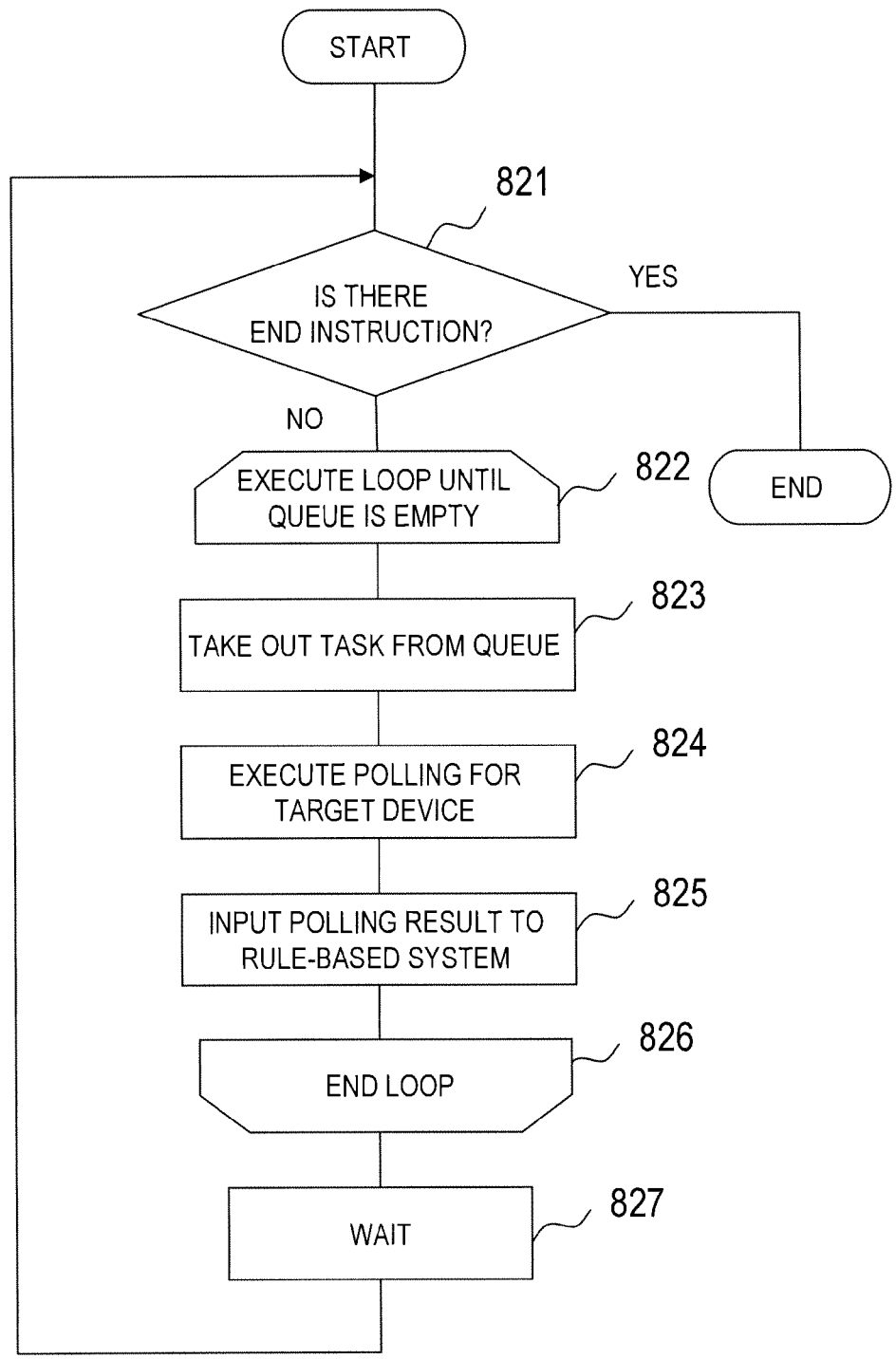
FIG. 21 is a flowchart illustrating processing of a polling task execution program according to the fourth embodiment of this invention.

FIG. 21 is a flowchart illustrating processing of the polling task execution program 820 according to the fourth embodiment of this invention.

First, in Step 821, the polling task execution program 820 judges whether an end instruction has been received from the administrator 620. Generally, the end instruction from the administrator 620 is a program end instruction which the administrator 620 enters by using the I/O terminal 150. If it is judged in Step 821 that the program end instruction has been received, the polling task execution program 820 finishes the process. On the other hand, if it is judged in Step 821 that no program end instruction has been received, the polling task execution program 820 executes next Step 822.

The polling task execution program 820 executes loop processing through loop start processing (Step 822) and loop end processing (Step 826). Specifically, the polling task execution program 820 repeats execution of Steps 823 to 825 until there are no more contents in the polling task queue 850.

In Step 823, the polling task execution program 820 takes out one task from the head of the polling task queue 850.

In Step 824, the polling task execution program 820 executes polling corresponding to the taken-out task. Specifically, the polling task execution program 820 refers to the event table 250 by using an event ID (e.g., E3) taken out of the polling task queue 850 as a key to obtain a corresponding IP address, an acquisition method, an ID, and a PW. The polling task execution program 820 executes polling for an actual device by using the IP address, the acquisition method, the ID, and the PW which have been obtained.

In Step 825, the polling task execution program 820 generates input data based on an execution result of the polling to supply it as input information to the rule-based module 300. The input information contains information indicating that an event defined in the event definition table 250 has been detected by the polling. If no event is detected by the polling, there is no need to supply the input information to the rule-based module 300.

In Step 827, the polling task execution program 820 executes WAIT processing for a predetermined time, for example, 5 minutes. This predetermined time may be shorter or longer than 5 minutes.

After execution of Step 827, the process returns to Step 821 to be continued until reception of an end instruction.

According to the embodiment, the re-evaluation program 560 is executed according to an instruction form an administrator 620. For example, the administrator 620 refers to a GUI screen 160 to check an inferring result. If an established inferring result is not present, or if the established inferring result is different from that expected by the administrator 620, the administrator 620 operates an inferring result re-evaluation button 169 to execute the re-evaluation program 560.

Figure 22:
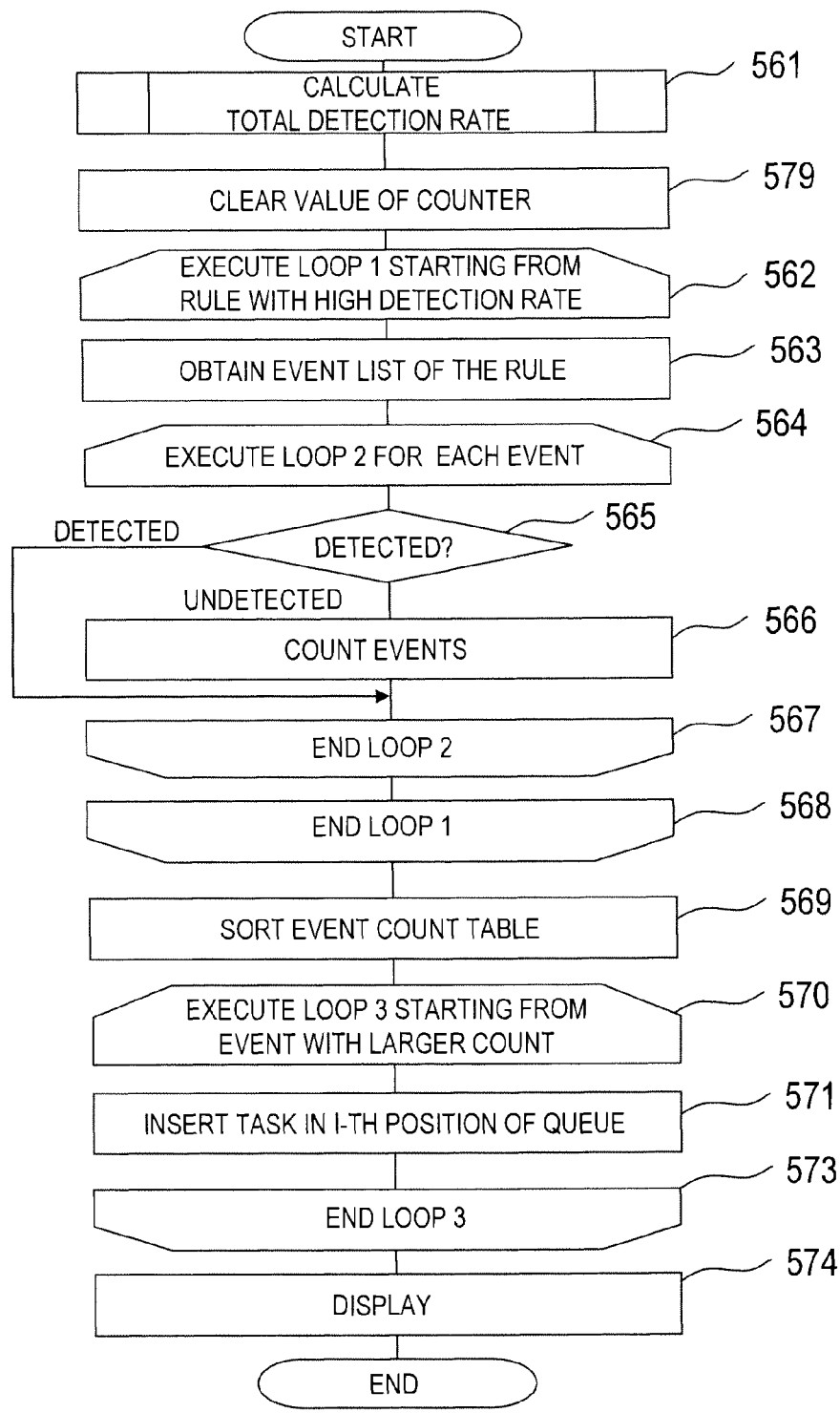
FIG. 22 is a flowchart illustrating processing of the re-evaluation program according to the fourth embodiment of this invention.

FIG. 22 is a flowchart illustrating processing of the re-evaluation program 560 according to the fourth embodiment of this invention.

First, in Step 561, the re-evaluation program 560 instructs execution of a total detection rate calculation program 420. A detection situation management table 450 is updated by the total detection rate calculation program 420.

Next, in Step 579, the re-evaluation program 560 clears a counter of the event count table 540. Specifically, the re-evaluation program 560 sets "0" in the column 542 of all lines of the event count table 540.

Next, the re-evaluation program 560 executes loop processing through start processing of a loop 1 (Step 562) and end processing of the loop 1 (Step 568). Specifically, the re-evaluation program 560 executes Steps 563 to 567 for lines (e.g., lines 454 and 455) of the detection situation management table 450.

In Step 563, the re-evaluation program 560 obtains data of event list corresponding to a rule indicated by each line of the detection situation management table 450. For example, in the case of a rule of the line 454, subdata 460 is referred to based on a column 453 to obtain lines 463 and 464.

The re-evaluation program 560 executes loop processing through start processing of a loop 2 (Step 564) and end processing of the loop 2 (Step 567). Specifically, the re-evaluation program 560 executes Steps 565 to 566 for each event (e.g., event corresponding to line 463).

In Step 565, the re-evaluation program 560 refers, for each event (e.g., event corresponding to line 463), to a value of a column 462 to judge whether the event has been detected. If the event has not been detected (e.g., value of column 462 is "F"), the re-evaluation program 560 executes Step 566.

In Step 566, the re-evaluation program 560 counts events. Specifically, the re-evaluation program 560 refers to the event count table 540 to add "1" to a value in the column 542 of the line corresponding to the event judged to have been undetected in Step 565.

In Step 569, the re-evaluation program 560 sorts (rearranges) lines of the event count table 540. Specifically, the lines of the event count table 540 are sorted in order starting from lines with larger values of the count column 542.

The re-evaluation program 560 executes loop processing through start processing of a loop 3 (Step 570) and end processing of the loop 3 (Step 573). Specifically, the re-evaluation program 560 executes Step 571 for the lines of the event count table 540 sorted based on the counts.

In Step 571, the re-evaluation program 560 additionally inserts an event indicated by each line of the event count table 540 into the i-th position of the polling task queue 850. In this case, "i" is an index where an initial value is "1" and to which 1 is added for each repetition of a loop of Steps 570 to 573. In other words, the lines of the event count table 540 are sorted in order of polling priority in Step 569, and an event is additionally inserted into the i-th position of the polling task queue 850 according to the priority.

While the processing of the loop 3 is executed, preferably, exclusive processing should be executed for the polling task queue 850.

In Step 574, the re-evaluation program 560 displays information of an inferring result on the GUI screen 160 based on information of the detection situation management table 450.

The rest of the processing of the fourth embodiment is similar to that of the third embodiment, and thus description thereof will be omitted.

FIG. 19 illustrates an example of a status where a task of special polling (for event E3) is additionally inserted as a head (first) element of the polling task queue 850 with respect to the status of the polling task queue 850 shown in FIG. 18. This example corresponds, for example, to a case where only the event E3 has not been detected in the example of FIG. 5. In this case, as next polling, polling for the event E3 is first executed. As a result, for the event E3, the polling is executed at an interval shorter than regular polling execution interval.

According to the fourth embodiment, in the operation management system equipped with the rule-based inference processing function, polling is executed in order starting from an event with higher priority without waiting for timing of next regular polling. According to the fourth embodiment, control is performed to prevent execution of normal regular polling and special polling at very short intervals. Thus, an inferring result can be quickly established while processing loads on the management server are maintained constant.

Figure 23:
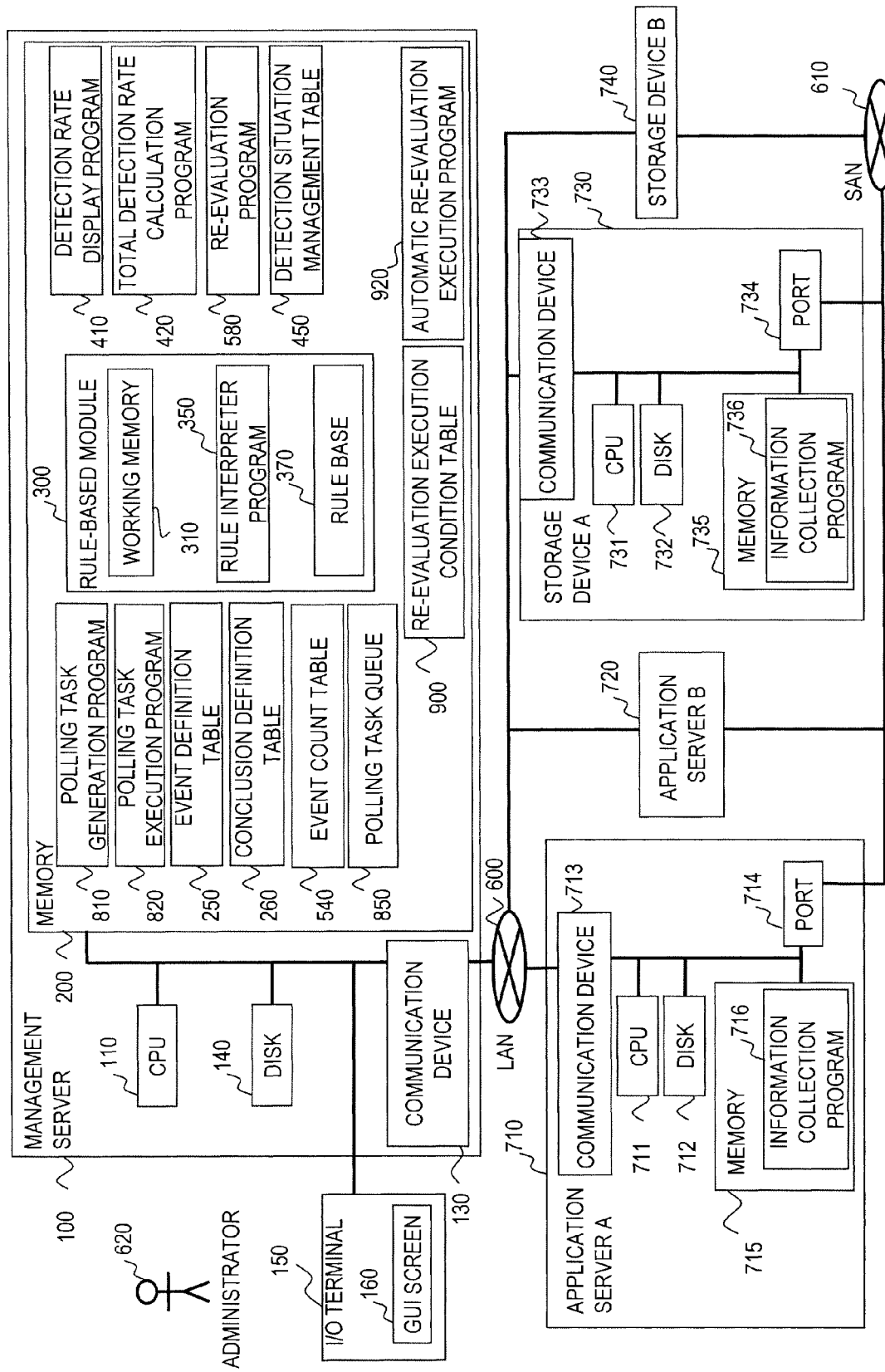
FIG. 23 is a block diagram illustrating a configuration of an operation management system according to a fifth embodiment of this invention.
Figure 25:
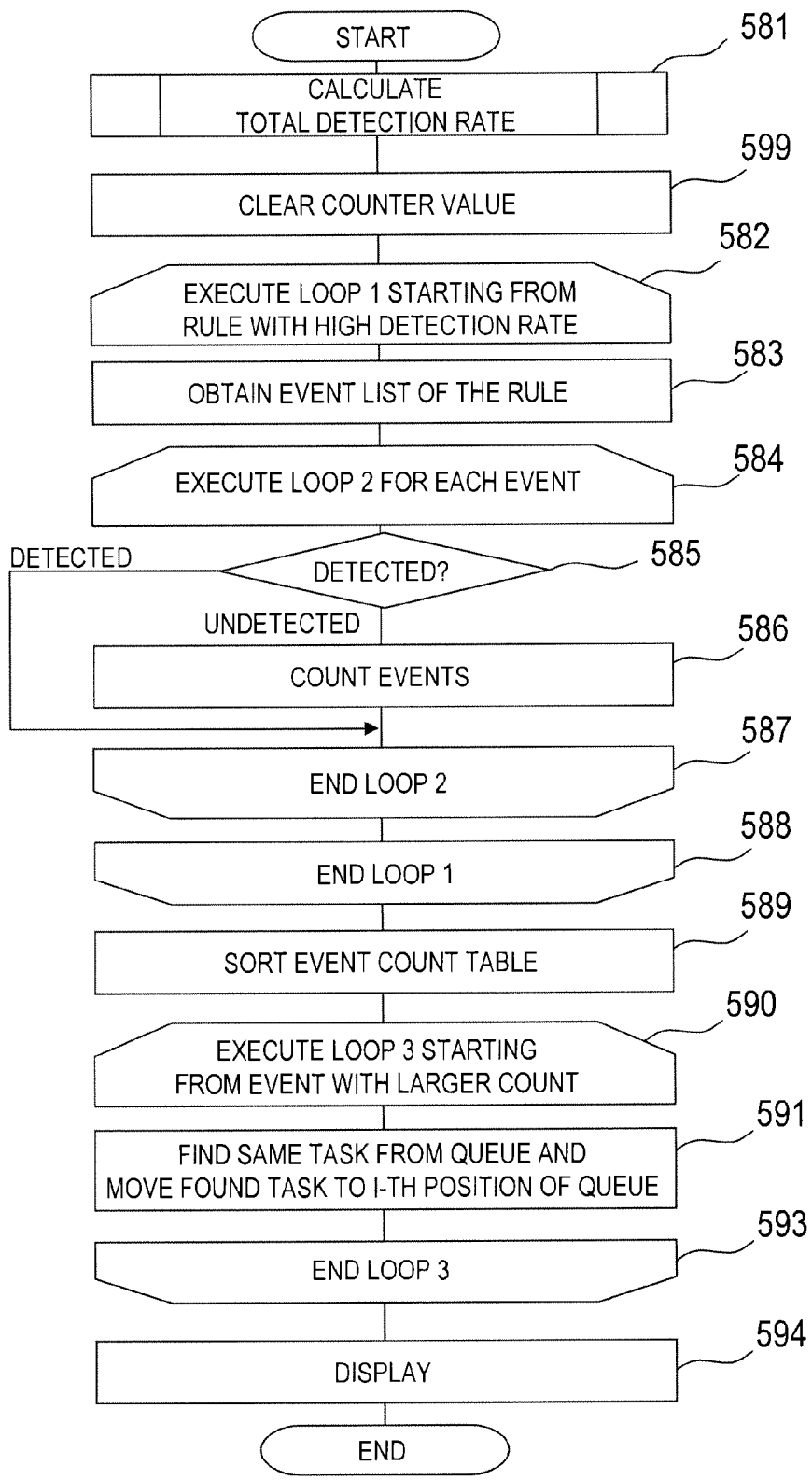
FIG. 25 is a flowchart illustrating processing of the re-evaluation program according to the fifth embodiment of this invention.

Referring to FIGS. 23 to 25, a fifth embodiment of this invention will be described. The fifth embodiment corresponds to a modified example of the fourth embodiment.

According to the fourth embodiment, because normal regular polling and special polling are not simultaneously executed by the detection situation management table 450, the polling task queue 850, the re-evaluation program 560, the polling task generation program 810, and the polling task execution program 820, control is performed to maintain constant the loads on the management server 100.

However, according to the fourth embodiment, the special polling is executed in addition to the normal regular polling. Thus, processing loads on the management server 100 are increased.

Thus, the fifth embodiment is designed to reduce the number of special polling times as much as possible. According to the fifth embodiment, if there is a normal polling task for the same event as that of a special polling task in a polling task queue 850, a re-evaluation program 580 performs control to move the normal polling task to the front of the polling task queue 850 without executing special polling for the event.

FIG. 23 is a block diagram illustrating a configuration of an operation management system according to the fifth embodiment of this invention.

The fifth embodiment is different from the fourth embodiment in that the re-evaluation program 560 of the management server 100 is replaced by the re-evaluation program 580.

FIG. 24 illustrates an example of the polling task queue 850 at a certain time point in the middle of execution of the re-evaluation program 580 according to the fifth embodiment of this invention.

In an example of FIG. 24, "E3", "E1", "E2", and "E4" are respectively set in the event ID column 852 corresponding to values "1", "2", "3", and "4" of the order column 851 (lines 862, 863, 864, and 865, respectively). In this case, polling is executed in order of the events E3, E1, E2, and E4.

According to the embodiment, the re-evaluation program 580 is executed according to an instruction from an administrator 620. For example, the administrator 620 refers to a GUI screen 160 to check an inferring result. If an established inferring result is not present, or if an established inferring result is different from that expected by the administrator 620, the administrator 620 operates an inferring result re-evaluation button 169 to execute the re-evaluation program 580.

FIG. 25 is a flowchart illustrating processing of the re-evaluation program 580 according to the fifth embodiment of this invention.

As shown in FIG. 25, the processing of the re-evaluation program 580 is similar to that of the re-evaluation program 560 shown in FIG. 22 except for replacement of Step 571 by Step 591. Thus, only Step 591 will be described, omitting description of the other Steps.

In Step 591, the re-evaluation program 580 finds the same event as that indicated by each line of an event count table 540 in a polling task queue 850, and moves the found event to the task at the i-th position of the polling task queue 850. In this case, i is an index described above referring to FIG. 22. Accordingly, the event is moved ahead of a current position (position near head) in the polling task queue 850. If the corresponding event is not present in the polling task queue 850, a task corresponding to the event is generated to be additionally inserted into the i-th position of the polling task queue 850.

While processing of a loop 3 is executed, preferably, exclusive processing should be executed for the polling task queue 850.

FIG. 24 illustrates an example of a status where a special polling task (for event E3) is moved to the head (first) of the polling task queue 850 with respect to the status of the polling task queue 850 shown in FIG. 18. This corresponds, for example, to a case where only the event E3 has not been detected in the example of FIG. 5. In this case, as next polling, polling for the event E3 is first executed. As a result, for the event E3, polling is executed at an interval shorter than an execution interval of normal polling.

According to the fifth embodiment, in the operation management system equipped with the rule-based inference processing function, polling is executed in order starting from an event with higher priority without waiting for timing of next regular polling. According to the fifth embodiment, because the number of polling execution times is reduced as compared with the fourth embodiment, an inferring result can be quickly established while processing loads on the management server are maintained constant.

As described above, the method of the embodiments of this invention include Step of detecting a failure by regular polling, Step of finding a management target device highly likely to have a failure (predicted failure) based on information detected by the polling, and Step of controlling timing to collect information more quickly than usual for the predicted failure.

For example, if a plurality of if-then rules are defined, first, a rule where at least one event of an event set of an if-conditional sentence is specified as an inspection target. Then, a complementary set (events which are still undetected) can be specified as a predicted failure from the if-conditional sentence of the inspection target rule.

Information collection faster than usual for the predicted failure can be realized by, for example, immediately executing polling for the predicted failure. Alternatively, the information collection faster than usual can be realized by prioritizing polling of a plurality of predicted failures, and immediately executing polling in order starting from a failure with higher priority. Otherwise, the information collection faster than usual can be realized by controlling a regular polling execution schedule to execute polling of a predicted failure faster than usual.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
   a plurality of devices; and
   a management computer configured to:
   store, in the management computer, rule information including a first rule indicating a first conclusion that is output when all of a first plurality of events have been detected, and a second rule indicating a second conclusion that is output when all of a second plurality of events have been detected;

conduct regular polling of the plurality of devices to obtain information related to the first plurality of events and the second plurality of events;

calculate a first ratio based at least in part on events of the first plurality of events that were detected by the regular polling;

calculate a second ratio based at least in part on events of the second plurality of events that were detected by the regular polling; and conduct additional polling with respect to at least one of the plurality of devices to obtain one or more undetected events of the first or second plurality of events, based on the first ratio and the second ratio;

wherein, if the first ratio is higher than the second ratio, the additional polling with respect to the first plurality of events, instead of the additional polling with respect to the second plurality of events, is conducted.

2. A computer system according to claim 1, wherein the management computer is configured to:

hold, in the management computer, task queue information indicating an order of the regularly polling and the additional polling to be executed;

conduct polling of at least one of the plurality of devices corresponding to a head of the task queue information as a part of the regularly polling; and update the task queue information to add the additional polling of the undetected events in an order of polling.

3. A computer system according to claim 1, wherein the management computer is configured to:

hold, in the management computer, task queue information indicating an order of the regularly polling and the additional polling to be executed;

poll at least one of the plurality of devices corresponding to a head of the task queue information as a part of the regularly polling; and update the task queue information to move an order of the additional polling of the undetected events ahead to an order of the regularly polling.

4. A computer system according to claim 1, wherein the first ratio is calculated based at least on a number representing all of the first plurality of events and a number of detected events among said all of the first plurality of events; and wherein the second ratio is calculated based at least on a number representing all of the second plurality of events and a number of detected events among said all of the second plurality of events.

5. A computer system according to claim 1, wherein the first ratio is calculated based at least on the detected events among said all of the first plurality of events with weighting; and wherein the second ratio is calculated based at least on the detected events among said all of the second plurality of events with weighting.

6. A computer system according to claim 1, wherein the management computer is configured to:

determine if all of the first plurality of events or all of the second plurality of events have been detected; and display information that the first conclusion is established or not, based on the first ratio, or display information that the second conclusion is established or not, based on the second ratio.

7. A computer system according to claim 1, wherein the regularly polling is executed repeatedly with a first interval by the management computer; and the additional polling is executed before next timing of the regularly polling.

8. A computer system according to claim 1, wherein a repeating interval of the additional polling is shorter than a repeating interval of the regularly polling.

9. A computer system according to claim 1, wherein the calculation of the first ratio is executed repeatedly with a certain interval.

10. A computer system according to claim 1, wherein the management computer starts the additional polling after receiving instructions.

11. A computer system according to claim 1, wherein the management computer starts the additional polling after passage of predetermined time.

12. A computer system according to claim 1, wherein the management computer starts the additional polling after detecting a certain event.

* * * * *